United States Patent
Jiang et al.

(10) Patent No.: US 9,275,300 B2
(45) Date of Patent: Mar. 1, 2016

(54) METHOD AND APPARATUS FOR GENERATING IMAGE DESCRIPTION VECTOR, IMAGE DETECTION METHOD AND APPARATUS

(71) Applicant: CANON KABUSHIKI KAISHA, Tokyo (JP)

(72) Inventors: Yong Jiang, Beijing (CN); Wenwen Zhang, Beijing (CN); Lifeng Xu, Beijing (CN)

(73) Assignee: Canon Kabushiki Kaisha, Tokyo (JP)

( * ) Notice: Subject to any disclaimer, the term of this patent is extended or adjusted under 35 U.S.C. 154(b) by 112 days.

(21) Appl. No.: 13/774,281

(22) Filed: Feb. 22, 2013

(65) Prior Publication Data

US 2013/0223683 A1   Aug. 29, 2013

(30) Foreign Application Priority Data

Feb. 24, 2012   (CN) .......................... 2012 1 0044156
Feb. 24, 2012   (CN) .......................... 2012 1 0045691

(51) Int. Cl.
   *G06K 9/46*   (2006.01)
   *G06K 9/48*   (2006.01)

(52) U.S. Cl.
   CPC .............. *G06K 9/481* (2013.01); *G06K 9/4638* (2013.01); *G06K 9/4671* (2013.01)

(58) Field of Classification Search
   CPC .... G06K 9/4638; G06K 9/4671; G06K 9/481
   See application file for complete search history.

(56) References Cited

U.S. PATENT DOCUMENTS 7,092,554 B2 *   8/2006   Chen et al. .................... 382/118

FOREIGN PATENT DOCUMENTS

| CN | 1384464 A | 12/2002 |
|---|---|---|
| CN | 1568479 A | 1/2005 |
| CN | 101551823 A | 10/2009 |
| CN | 101582077 A | 11/2009 |

OTHER PUBLICATIONS

Pietikainen et al., "Local Binary Patterns for Still Images", Computer Vision Using Local Binary Patterns Computational Imaging and Vision vol. 40, 2011, 13-47.*

Tan et al., "Enhanced Local Texture Feature Sets for Face Recognition Under Difficult Lighting Conditions", 2007, Springer, LNCS 4778, 168-182.*

(Continued)

*Primary Examiner* — Katrina Fujita
(74) *Attorney, Agent, or Firm* — Canon U.S.A., Inc. IP Division

(57) ABSTRACT

This invention relates to a method and an apparatus for generating an image description vector, an image detection method and apparatus. The method for generating an image description vector comprising: an encoding step of encoding each of a plurality of pixel regions of an image into M pieces of N-bit binary codes, wherein each bit of an N-bit binary code represents a neighboring pixel region which is in neighborhood of a corresponding pixel region; and a generating step of generating an image description vector of the image based on matching at least one of the M pieces of N-bit binary code of each pixel region of the plurality of pixel regions with a particular code pattern, where M is an integer of 3 or larger, and N is an integer of 3 or larger.

26 Claims, 23 Drawing Sheets

(56) References Cited

OTHER PUBLICATIONS

Gao et al., "Combining Local Binary Patterns and Visual Attention for Face Recognition", Apr. 2011, I.J. Engineering and Manufacturing 2011, 2, 72-78.*

Huang et al., "A Rapid Texture-Based Moving Object Detection Method", May 15-18, 2011, Proceedings of 2011 8th Asian Control Conference (ASCC), 1205-1209.*

Liao et al, "Face recognition with salient local gradient orientation binary patterns", Image Processing (ICIP), 2009 16th IEEE International Conference on, 3317-3320.*

Shan et al., "Robust facial expression recognition using local binary patterns", Image Processing, 2005. ICIP 2005. IEEE International Conference on, vol. 2, II-370-3.*

Tang et al., "Multi-scale analysis of color and texture for salient object detection", Sep. 11-14, 2011, Image Processing (ICIP), 2011 18th IEEE International Conference on, 2401-2404.*

Timo Ojala, Matti Pietikäinen, Multi-resolution Gray-Scale and Rotation Invariant Texture Classification with Local Binary Patterns, IEEE Transaction on Pattern Analysis and Machine Intelligence, Jul. 2002, 24(7):971-987, IEEE, New York City, NY, 2002.

Xiaoyang Tan, Bill Triggs, Enhanced Local Texture Feature Sets for Face Recognition Under Difficult Lighting Conditions, IEEE Transactions on Image Processing, Jun. 2010, 19(6):1635-1650, IEEE, New York City, NY, 2010.

Paul Viola, Michael Jones, Rapid Object Detection using a Boosted Cascade of Simple Features, 2001.

Krystian Mikolajczyk, Bastian Leibe, Bernt Schiele, Multiple Object Class Detection with a Generative Model, 2006.

Renato O. Stehling, Mario A. Nascimento, Alexandre X. Falcão, A Compact and Efficient Image Retrieval Approach Based on Border/Interior Pixel Classification, Proceedings of the Eleventh International Conference on Information and Knowledge Management, Nov. 4-9, 2002, pp. 102-109, 2002, ACM, New York City, NY, 2002.

Greg Pass, Ramin Zabih, Justin Miller, Comparing Images using Color Coherence Vectors, 1996.

* cited by examiner

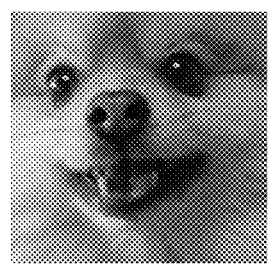
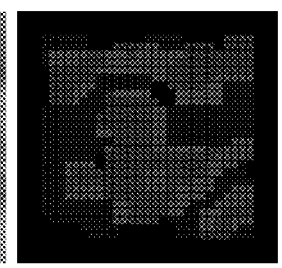
Fig. 34A　　　　Fig. 34B
Fig. 34C
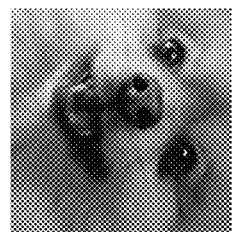
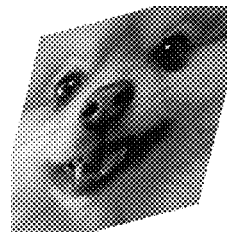
Fig. 37A　　　　　　　　Fig. 37B

METHOD AND APPARATUS FOR GENERATING IMAGE DESCRIPTION VECTOR, IMAGE DETECTION METHOD AND APPARATUS

BACKGROUND OF THE INVENTION

1. Field of the Invention

The present invention relates to a method and an apparatus for generating an image description vector, as well as an image detection method and an image detection apparatus.

2. Description of the Related Art

Great progress has been made for detection technology of specific objects or targets (such as people, faces, cars, etc.) in the last few decades. In order to describe morphology of an image, discriminative features or patterns can be extracted from the image to form an image descriptor (image description vector). In some techniques, a training process which uses a large quantity of samples is necessary. While for more general or training-free object detection, an effective and robust feature descriptor (description vector) is very important.

Traditional image regional description method uses a feature vector which represents the global distribution of the feature of the image without any spatial or structure related information, thus it has limited discrimination and be liable to false positive.

Recently, image partition based methods have been introduced. Generally, the image partition based methods firstly partition the whole image into pre-defined regions; then generate a feature vector for each of the partitioned image regions independently; and finally combine all the generated feature vectors into a single descriptor for the whole image. Therefore, the single descriptor for the whole image integrates spatial or structure related information of the image and will be more powerful to represent the image.

In particular, two kinds of image partition based methods have been widely used. One image partition based method is called grid based image partition method, as shown in FIG. 1. The grid based image partition method firstly divides the image into multiple regular grids, for example, square grids, then extracts feature vector in each grid region and finally assembles all the grid region feature vectors into a single feature vector sequentially to obtain the descriptor for the image.

The single descriptor for the whole image is commonly illustrated in form of histogram as shown in FIG. 1, in which the abscissas axis indicates the color component in a predetermined color space in bin, and the vertical axis indicates the appearance frequency of the pixels corresponding to each color component, which usually can be represented by the number of the pixels.

However, the grid based image partition method is sensitive to in-plane rotation, for example when the image is rotated by 90°, the histogram of the descriptor will be much different. That is, the descriptor generated by the grid based image partition method is sensitive to in-plane rotation and not so robust.

Another image partition based method is called circular based image partition method, as shown in FIG. 2. The circular based image partition method divides the image into multiple concentric ring regions, and the center of the multiple concentric ring regions is the image center. Thus the descriptor generated by the circular based image partition method is robust against in-plane rotation. But the circular based image partition method does not consider the image characters, which limits its robustness. Furthermore, the method is sensitive to out-plane rotation and deformation.

As seen from the above description, although the image partition based method can generate an image descriptor which includes spatial or structure related information on the image and may somewhat powerfully present the image, the image partition based method is sensitive to rotation of the image, such as the in-plane or out-plane rotation, and thus the robustness of the descriptor generated by the image partition based method is limited.

Currently, pixel classification based methods have been proposed to overcome the drawbacks of the image partition based methods and to achieve more robust descriptor. The pixel classification based methods firstly classify the pixels included in the image into several categories, then generate feature vectors for the categories and finally combine all the feature vectors into a single descriptor.

Two kinds of pixel classification based color feature description method have been introduced and widely used in content-based image retrieval.

One pixel classification based method is called as BIC (Border/Interior Color) method as cited in Document 3. The BIC method first quantizes pixels in a specified color space with a predefined quantization schema; after that, classifies the pixels as border or interior pixels. A pixel is classified as border when it is at border of the image itself (e.g. pixels at image outlier borders shown in FIG. 3) or at least one of its 4 neighbors has a different quantization color (e.g. pixels at the quantized borders); a pixel is classified as interior when all its 4 neighbors have the same quantization color. Finally, generate a descriptor constituted by two color histograms (shown in FIG. 3), the two color histograms representing statistic color distribution for interior and border pixels separately.

However, although the robustness of the descriptor generated by BIC method is somewhat improved, the descriptor is sensitive to illumination variation and noise since the image border is sensitive to illumination variation and noise. Furthermore, since the quantized border depends on color quantization schema, which makes the classification process to couple with color features, the descriptor is also feature dependent.

Another pixel classification based method is called as CCV (Color Coherent Vector) method as cited in Document 4. The CCV classification method is based on the size of the connected components and an pre-defined empirical size threshold is introduced. When a pixel is part of a contiguous region with size being bigger than the pre-defined threshold, classify the pixel as coherent pixel (e.g. Red (dark grey) and green (light grey) pixels in FIG. 4); otherwise, classify the pixel as incoherent pixel (e.g. Blue (medium grey) pixels in FIG. 4).

Based on the above states, only when at least one color of the image is full of texture or constitutes small scattered patches, the CCV method is efficient; otherwise, it will reduce to the simple global color histogram (GCH). Furthermore, the descriptor generated by the method is has no spatial or topology information, thus it is a little more effective than GCH.

As seen from the above description, although the pixel classification based methods are robust with respect to the in-plane or out-plane rotation, such methods may be sensitive to illumination variance and noise. Furthermore, the BIC method and CCV method both perform quantization before pixel classification, and thus the generation result of the two methods depend on color quantization schema, which make the classification process of the two method couple with color features. Therefore, the descriptor generated by the pixel classification method is further limited to color features of the image, that is, feature dependent.

In view of the above, few prior techniques can obtain descriptor for image which is robust against illumination variance, view-point change, non-rigid deformation, etc. and is feature independent.

Recently, Local Binary Pattern (LBP) descriptors and Local Ternary Pattern (LTP) descriptors are proposed as powerful grey-scale invariant local texture descriptors for describing microstructures of images (please see, for example, T. Ojala, M. Pietikainen and T. Maenpaa, "Multi-resolution Gray-Scale and Rotation Invariant Texture Classification with Local Binary Patterns", IEEE Transaction on pattern analysis and machine intelligence, 24(7), 2002, and Xiaoyang Tan and Bill Triggs, "Enhanced Local Texture Feature Sets for Face Recognition Under Difficult Lighting Conditions", IEEE Transactions on Image Processing, pp. 1635-1650, 19(6), 2010). These two patterns (image descriptors) are widely used in the field of face recognition and have achieved great success.

Now the LBP descriptor and the LTP descriptor will be described briefly with reference to FIGS. 5 and 6.

FIG. 5 is a schematic diagram showing the principle of the LBP descriptor.

As shown in FIG. 5, the LBP method encodes each pixel in an image into one piece of 8-bit binary code. More specifically, for a 3×3 matrix of pixels, if a neighbouring pixel has a pixel value larger than or equal to that of the centre pixel, a bit representing this neighbouring pixel in the 8-bit binary code is set to "1", and if a neighbouring pixel has a pixel value smaller than that of the centre pixel, a bit representing this neighbouring pixel in the 8-bit binary code is set to "0". In this way, the 8-bit binary code for the centre pixel is formed by thresholding the eight neighbouring pixels with respect to the pixel value of the centre pixel. In FIG. 5, white dots indicate binary bit "1" and black dots indicate binary bits "0". The LBP feature can describe texture structures around the encoded pixel (centre pixel).

However, the single threshold and the two-pixel comparison make the LBP method very sensitive to noise, and the reliability will decrease significantly under intensive illumination. In addition, the encoding schema limits the LBP feature to present only a small set of texture structures, like lighter or darker edges and dots. Furthermore, the structures represented by the LBP features merely capture the surrounding features of the pixel, while the feature of that pixel itself is lost.

FIG. 6 is a schematic diagram showing the principle of the LTP descriptor.

As shown in FIG. 6, the LTP method encodes each pixel in an image into an 8-bit ternary code. More specifically, for a 3×3 matrix of pixels, if a neighbouring pixel has a pixel value larger than an upper threshold, a bit representing this neighbouring pixel in the 8-bit ternary code is set to "1", if a neighbouring pixel has a pixel value not larger than the upper threshold and not smaller than a lower threshold, a bit representing this neighbouring pixel in the 8-bit ternary code is set to "0", and if a neighbouring pixel has a pixel value smaller than the lower threshold, a bit representing this neighbouring pixel in the 8-bit ternary code is set to "−1". The upper threshold can be set as (centre pixel value +T), and the lower threshold can be set as (centre pixel value −T), where T is a constant margin which can be set as appropriate. In this way, the 8-bit ternary code for the centre pixel is formed by double-thresholding the eight neighbouring pixels with respect to the pixel value of the centre pixel. In FIG. 6, white dots indicate ternary bits "1", black dots indicate ternary bits "−1" and grey dots indicate ternary bits "0".

By using double-thresholding, the LTP feature can describe texture structures around the encoded pixel (centre pixel) with improved robustness, and can preserve more detailed structure of the image than the LBP feature.

LIST OF THE CITED DOCUMENTS

[1]. P. Viola and M. Jones. Rapid object detection using a boosted cascade of simple features. IEEE CVPR, 2001.

[2]. K Mikolajczyk, B Leibe, B Schiele. Multiple object class detection with a generative model. IEEE Computer Society Conference on Computer Vision and Pattern Recognition, pp. 26-36, 2006

[3]. R. O. Stehling, M. A. Nascimentp, A. X. Falcao. A compact and efficient image retrieval approach based on border/interior pixel classification. In processed of the 11th international conference on Information and Knowledge Management, pp. 102-109, 2002

[4]. G. Pass, R. Zabih, and J. Miller. Comparing images using color coherence vectors. In proc. Of ACM Multimedia, Intl. Conf. pp. 65-73, 1996

SUMMARY OF THE INVENTION

The LTP feature can represent $3^8$=6561 kinds of patterns (structures) of an image and its surrounding, which are far more than the $2^8$=256 kinds of patterns that can be presented by the LBP feature. However, the inventors of the present invention have found that many of the 6561 kinds of LTP patterns represent undesirable structures (for example, structures of noise patterns). Too many patterns to be stored and used lead to low efficiency in describing an image. That is to say, although the LTP method can describe an image more finely and with more robustness than the LBP method, the efficiency is lowered significantly.

Therefore, there is a need for a new method for generating an image description vector that can finely while efficiently describe an image.

In order to solve the above technical problem, the present invention provides a method for generating an image description vector comprising: an encoding step of encoding each of a plurality of pixel regions of an image into M pieces of N-bit binary codes, wherein each bit of an N-bit binary code represents a neighbouring pixel region which is in neighbourhood of a corresponding pixel region; and a generating step of generating an image description vector of the image based on matching at least one of the M pieces of N-bit binary code of each pixel region of the plurality of pixel regions with a particular code pattern, where M is an integer of 3 or larger, and N is an integer of 3 or larger.

In addition, in order to solve the above technical problem, the present invention provides an apparatus for generating an image description vector comprising: an encoding unit configured for encoding each of a plurality of pixel regions of an image into M pieces of N-bit binary codes, wherein each bit of an N-bit binary code represents a neighbouring pixel region which is in neighbourhood of a corresponding pixel region; and a generating unit configured for generating an image description vector of the image based on matching at least one of the M pieces of N-bit binary code of each pixel region of the plurality of pixel regions with a particular code pattern, where M is an integer of 3 or larger, and N is an integer of 3 or larger.

In addition, the present invention provides a method for generating an image description vector of multi-resolution comprising: a first image description vector generating step of generating a first image description vector by performing the method for generating the image description vector described above on an input image; a resizing step of resizing the input image to generate a resized image; a second image description vector generating step of generating a second image description vector by performing the method for generating the image description vector described above on the resized image; and a cascading step of cascading the first image description vector and the second image description vector to generate an image description vector of multi-resolution.

In addition, the present invention provides an apparatus for generating an image description vector of multi-resolution comprising: a first image description vector generating unit configured for generating a first image description vector by performing the method for generating the image description vector described above on an input image; a resizing unit configured for resizing the input image to generate a resized image; a second image description vector generating unit configured for generating a second image description vector by performing the method for generating the image description vector described above on the resized image; and a cascading unit configured for cascading the first image description vector and the second image description vector to generate an image description vector of multi-resolution.

In addition, the present invention provides an image detection method comprising: an inputting step of inputting a regional image of an object image; an image description vector generating step of performing the method for generating the image description vector described above on the regional image to generate an image description vector as a regional image description vector; a calculating step of calculating a distance between the regional image description vector and a target image description vector registered in advance in a database, the target image description vector being formed in advance by performing the method for generating the image description vector described above on a target image; and a determining step of determining, if the distance is smaller than a particular threshold, that a regional image corresponding to the target image is detected; or adjusting, if the distance is not smaller than the particular threshold, the location and/or size of the regional image to obtain a regional image to be processed subsequently.

In addition, the present invention provides an image detection apparatus comprising: an inputting unit configured for inputting a regional image of an object image; an image description vector generating unit configured for performing the method for generating the image description vector described above on the regional image to generate an image description vector as a regional image description vector; a calculating unit configured for calculating a distance between the regional image description vector and a target image description vector registered in advance in a database, the target image description vector being formed in advance by performing the method for generating the image description vector described above on a target image; and a determining unit configured for determining, if the distance is smaller than a particular threshold, that a regional image corresponding to the target image is detected; or adjusting, if the distance is not smaller than the particular threshold, the location and/or size of the regional image to obtain a regional image to be processed next.

By virtue of the method and the apparatus for generating the image description vector according to the present invention, an image can be finely while efficiently described.

Further characteristic features and advantages of the present invention will be apparent from the following description with reference to the drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 28A and 28B illustrates two specific modes used for determining pixel region category, wherein FIG. 28A illustrates a first specific mode and FIG. 28B illustrates a second specific mode.

FIGS. 34A to 34C illustrates an application example in which the method according to the second embodiment of the present invention is applied, wherein FIG. 34A illustrates the original image to be described, FIG. 34B illustrates the pixel classification result of the original image achieved by the present method, and FIG. 34C illustrates obtained color feature vector of the original image.

FIGS. 37A to 37B illustrate images for comparison between the descriptor generation method according to the second embodiment of the present invention and circular based image partition method, wherein, FIG. 37A illustrates that an image resulting from an original image which has been subjected to In-plane rotation, FIG. 37B illustrates that an image resulting from the original image which has been subjected to Out-plane rotation.

DESCRIPTION OF THE EMBODIMENTS

Figure 1:
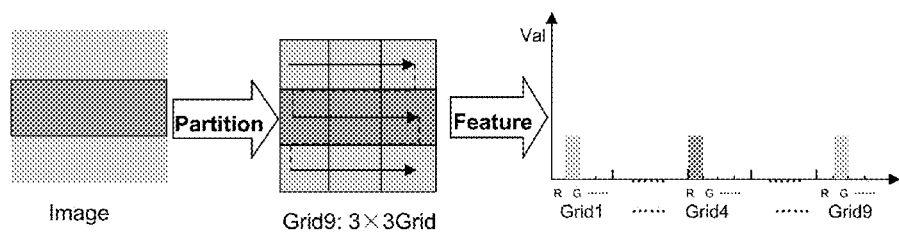
FIGS. 1-4 illustrate several color feature descriptor generating methods in the related art.
Figure 2:
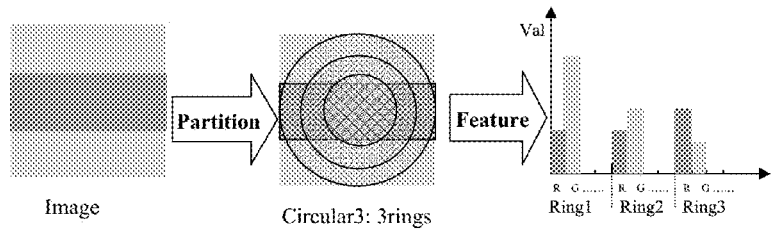

Embodiments of the present invention will be described in detail below with reference to the drawings.

Please note that similar reference numerals and letters refer to similar items in the figures, and thus once an item is defined in one figure, it need not be discussed for following figures.

Figure 7:
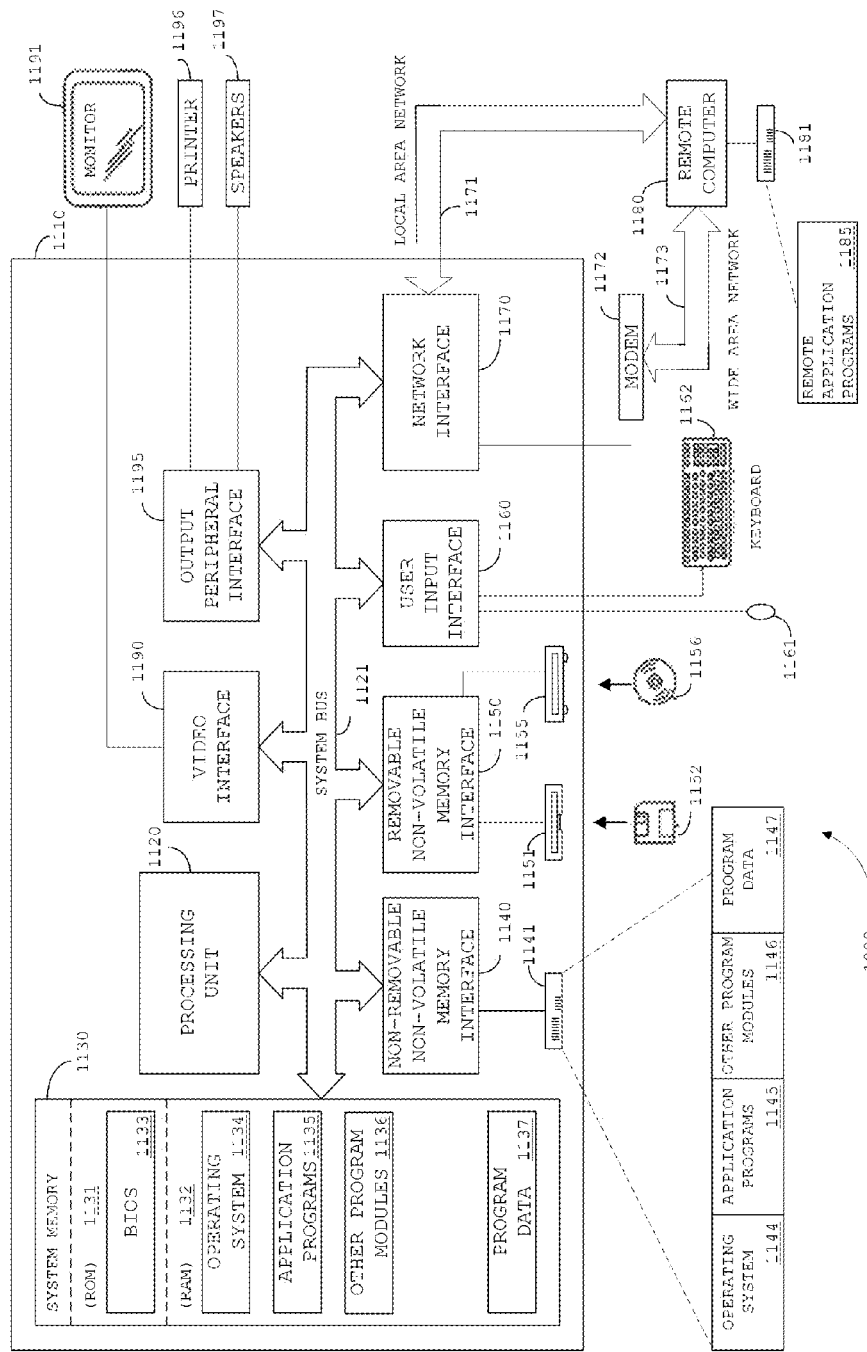
FIG. 7 is a schematic block diagram showing a hardware configuration of a computer system 1000 which can implement the embodiments of the present invention.

FIG. 7 is a block diagram showing a hardware configuration of a computer system 1000 which can implement the embodiments of the present invention.

As shown in FIG. 7, the computer system comprises a computer 1110. The computer 1110 comprises a processing unit 1120, a system memory 1130, non-removable non-volatile memory interface 1140, removable non-volatile memory interface 1150, user input interface 1160, network interface 1170, video interface 1190 and output peripheral interface 1195, which are connected via a system bus 1121.

The system memory 1130 comprises ROM (read-only memory) 1131 and RAM (random access memory) 1132. A BIOS (basic input output system) 1133 resides in the ROM 1131. An operating system 1134, application programs 1135, other program modules 1136 and some program data 1137 reside in the RAM 1132.

A non-removable non-volatile memory 1141, such as a hard disk, is connected to the non-removable non-volatile memory interface 1140. The non-removable non-volatile memory 1141 can store an operating system 1144, application programs 1145, other program modules 1146 and some program data 1147, for example.

Removable non-volatile memories, such as a floppy drive 1151 and a CD-ROM drive 1155, are connected to the removable non-volatile memory interface 1150. For example, a floppy disk 1152 can be inserted into the floppy drive 1151, and a CD (compact disk) 1156 can be inserted into the CD-ROM drive 1155.

Input devices, such a mouse 1161 and a keyboard 1162, are connected to the user input interface 1160.

The computer 1110 can be connected to a remote computer 1180 by the network interface 1170. For example, the network interface 1170 can be connected to the remote computer 1180 via a local area network 1171. Alternatively, the network interface 1170 can be connected to a modem (modulator-demodulator) 1172, and the modem 1172 is connected to the remote computer 1180 via a wide area network 1173.

The remote computer 1180 may comprise a memory 1181, such as a hard disk, which stores remote application programs 1185.

The video interface 1190 is connected to a monitor 1191.

The output peripheral interface 1195 is connected to a printer 1196 and speakers 1197.

The computer system shown in FIG. 7 is merely illustrative and is in no way intended to limit the invention, its application, or uses.

Figure 3:
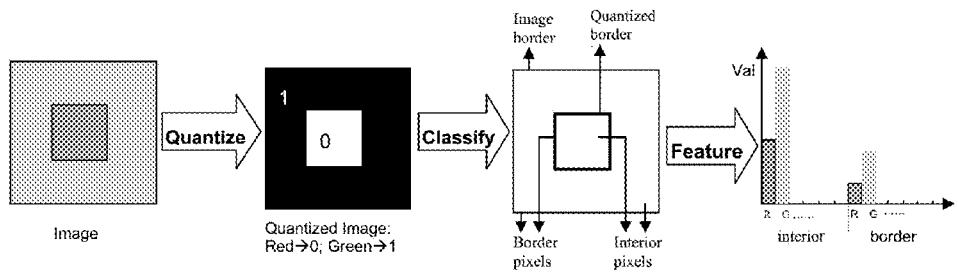
Figure 4:
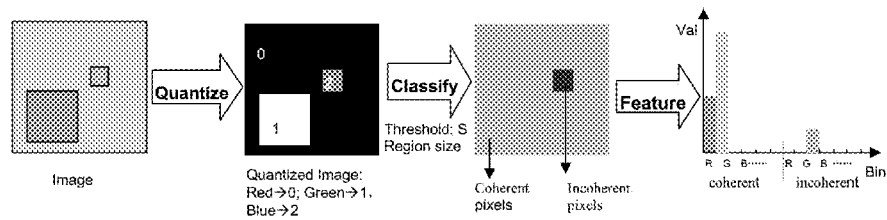
Figure 5:
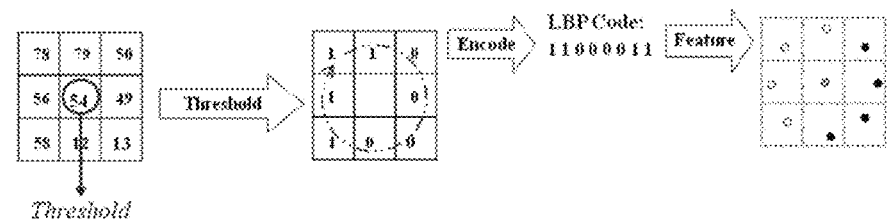
FIG. 5 is a schematic diagram showing the principle of the LBP descriptor.
Figure 6:
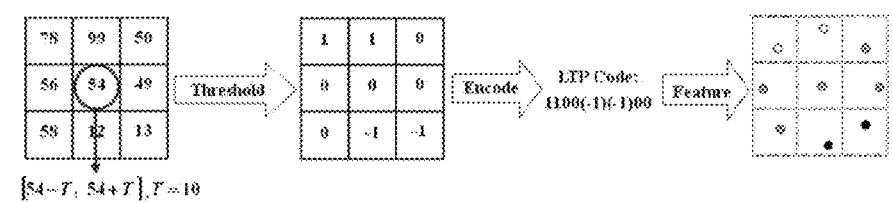
FIG. 6 is a schematic diagram showing the principle of the LTP descriptor.

The computer system shown in FIG. 3 may be implemented to any of the embodiments, either as a stand-alone computer, or as a processing system in an apparatus, possibly with one or more unnecessary components removed or with one or more additional components added.

Figure 8:
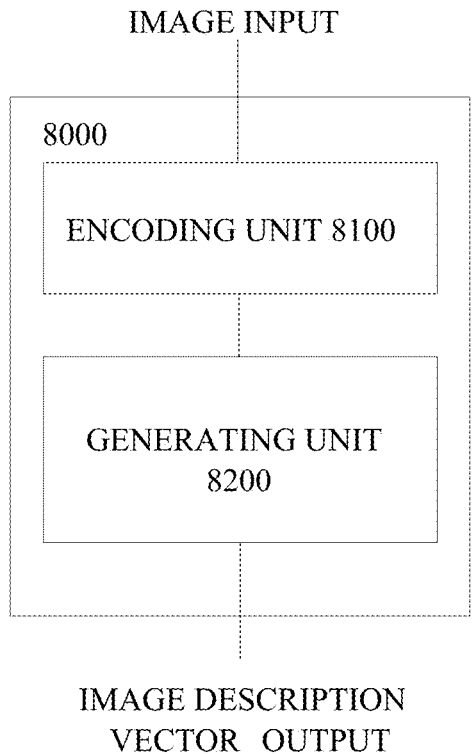
FIG. 8 is a schematic functional block diagram of an apparatus for generating an image description vector according to an embodiment of the present invention.

FIG. 8 shows a schematic functional block diagram of an apparatus 8000 for generating an image description vector according to an embodiment of the present invention.

As shown in FIG. 8, an apparatus 8000 for generating an image description vector according to the present invention comprises: an encoding unit 8100 configured for encoding each of a plurality of pixel regions of an image into M pieces of N-bit binary codes, wherein each bit of an N-bit binary code represents a neighbouring pixel region which is in neighbourhood of a corresponding pixel region; and a generating unit 8200 configured for generating an image description vector of the image based on matching at least one of the M pieces of N-bit binary code of each pixel region of the plurality of pixel regions with a particular code pattern, where M is an integer of 3 or larger, and N is an integer of 3 or larger.

Figure 9:
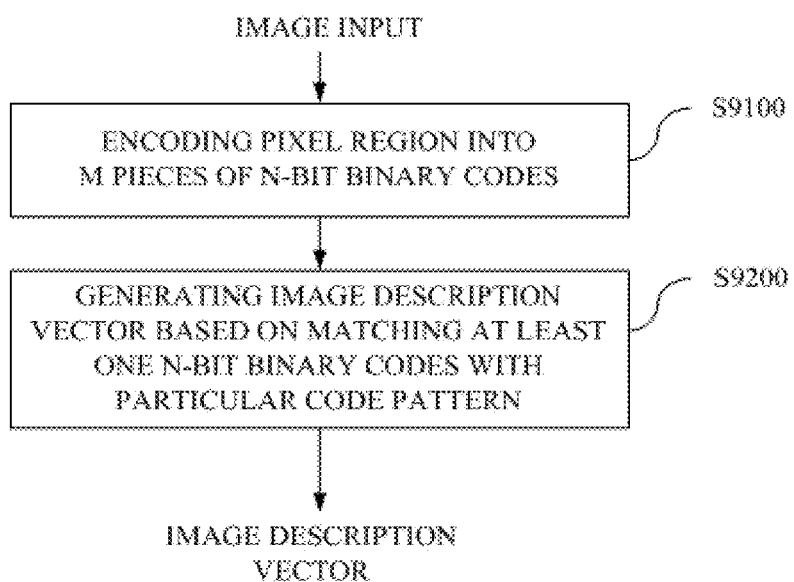
FIG. 9 is a schematic flowchart of a method for generating an image description vector according to an embodiment of the present invention.

FIG. 9 shows a schematic flowchart of a method for generating an image description vector according to an embodiment of the present invention. This method for generating an image description vector can be implemented by the apparatus 8000 shown in FIG. 8.

As shown in FIG. 9, the method for generating an image description vector comprises: an encoding step S9100 of encoding each of a plurality of pixel regions of an image into M pieces of N-bit binary codes, wherein each bit of an N-bit binary code represents a neighbouring pixel region which is in neighbourhood of a corresponding pixel region; and a generating step S9200 of generating an image description vector of the image based on matching at least one of the M pieces of N-bit binary code of each pixel region of the plurality of pixel regions with a particular code pattern, where M is an integer of 3 or larger, and N is an integer of 3 or larger.

The method and apparatus for generating an image description vector of the present invention can be implemented in a variety of manners, and two specific embodiments of the present invention will be described in detail so as to facilitate thorough understanding thereof.

[First Embodiment]

Hereinafter the method and apparatus for generating an image description vector according to the first embodiment of the present invention will be described.

Figure 10:
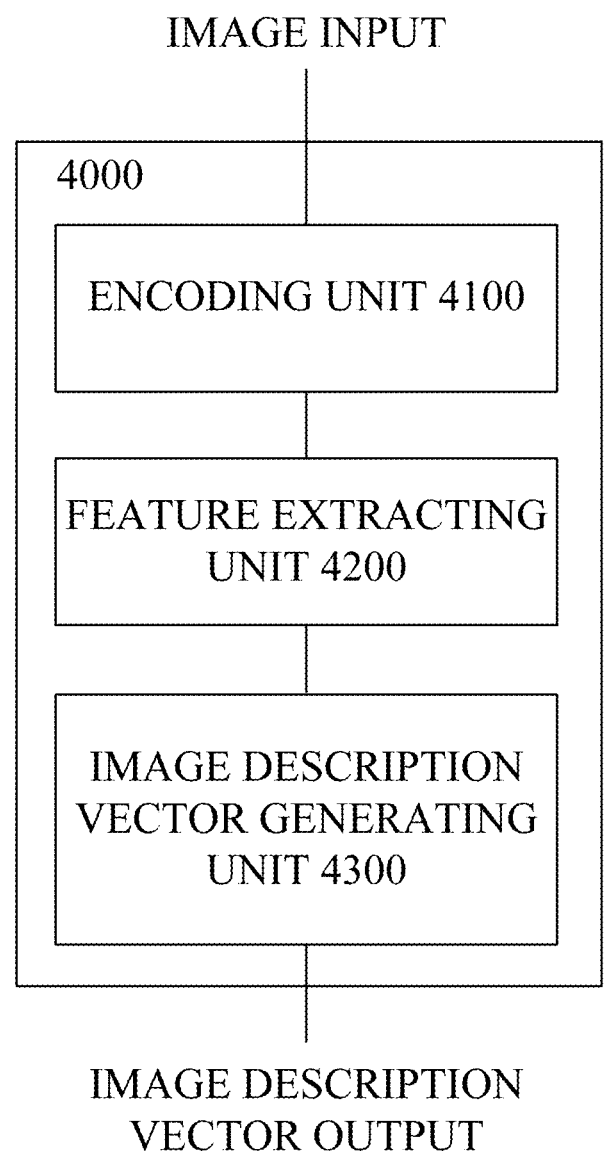
FIG. 10 is a schematic functional block diagram of an apparatus for generating an image description vector according to the first embodiment of the present invention.

FIG. 10 shows a schematic functional block diagram of an apparatus 4000 for generating an image description vector according to the first embodiment of the present invention.

As shown in FIG. 10, an apparatus 4000 for generating an image description vector according to the present invention comprises: an encoding unit 4100 configured for encoding each of a plurality of pixel regions of an image into M pieces of N-bit binary codes, wherein each of the plurality of pixel regions comprises one or more pixels, the M pieces of N-bit binary codes respectively correspond to M categories, and each bit of an N-bit binary code represents a neighbouring pixel region which is in neighbourhood of a corresponding pixel region; a feature extracting unit 4200 configured for, for an m-th N-bit binary code in each M pieces of N-bit binary codes corresponding to each pixel region of the plurality of pixel regions, if the m-th N-bit binary code matches a particular code pattern of an m-th category of the M categories among a plurality of particular code patterns, extracting the m-th N-bit binary code as a salient N-bit binary code of that m-th category; and an image description vector generating unit 4300 configured for, for each category of the M categories, counting the number of salient N-bit binary codes which match respective code patterns of the plurality of particular code patterns, to form an image description vector. M is an integer of 3 or larger, N is an integer of 3 or larger, and 1≤m≤M.

Figure 11:
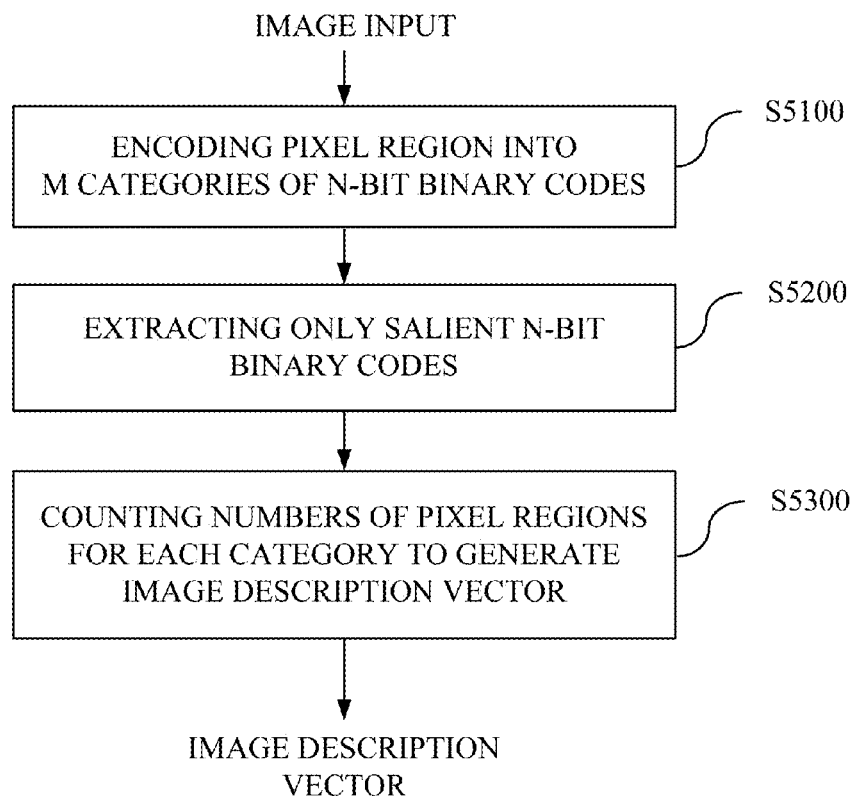
FIG. 11 is a schematic flowchart of a method for generating an image description vector according to the first embodiment of the present invention.

FIG. 11 shows a schematic flowchart of a method for generating an image description vector according to the present invention. This method for generating an image description vector can be implemented by the apparatus 4000 shown in FIG. 10.

As shown in FIG. 11, the method for generating an image description vector comprises: an encoding step S5100 of encoding each of a plurality of pixel regions of an image into M pieces of N-bit binary codes, wherein each of the plurality of pixel regions comprises one or more pixels, the M pieces of N-bit binary codes respectively correspond to M categories, and each bit of an N-bit binary code represents a neighbouring pixel region which is in neighbourhood of a corresponding pixel region; a feature extracting step S5200 of, for an m-th N-bit binary code in each M pieces of N-bit binary codes corresponding to each pixel region of the plurality of pixel regions, if the m-th N-bit binary code matches a particular code pattern of an m-th category of the M categories among a plurality of particular code patterns, extracting the m-th N-bit binary code as a salient N-bit binary code of that m-th category; and an image description vector generating step S5300 of, for each category of the M categories, counting the number of salient N-bit binary codes which match respective code patterns of the plurality of particular code patterns, to form an image description vector. M is an integer of 3 or larger, N is an integer of 3 or larger, and 1≤m≤M.

Furthermore, the step S5200 and step S5300 can be included in the above described generating step 9200.

According to the present invention, each pixel region of the image can be processed in this way to obtain M pieces of N-bit binary code for each pixel region. In addition, each N-bit binary code of the M pieces of N-bit binary code for one pixel can correspond to a particular code pattern of the corresponding category if it is a salient N-bit binary code, or correspond to a non-salient N-bit binary code otherwise.

According to the present invention, since only salient N-bit binary codes which match particular code patterns are extracted, the efficiency of generating the image description vector can be improved.

In addition, according to the present invention, since one pixel region is encoded into M pieces of N-bit binary code for this pixel region (M≥3 and N≥3) which are processed separately, the image can be finely described.

Preferably, the plurality of pixel regions of the image do not include pixel regions located at the border of the image, because the number of neighbouring pixel regions of the pixel regions on the border is smaller than N. However, it is also possible to assign default pixel region values to the pixel regions on the border.

According to one exemplary example, each of the plurality of pixel regions is constituted of only one pixel. Alternatively, each of the plurality of pixel regions can also be constituted of a plurality of pixels. The plurality of pixel regions can have equal or different number of pixels.

It is possible that the pixel regions are arranged in matrix. In this case, each pixel region can have a rectangular shape and each pixel region has eight neighbouring pixel regions (neighbouring pixel regions at the top, at the bottom, to the left, to the right, at the top-left, at the top-right, at the bottom-left and at the bottom-right). In this case, N is 8.

It is also possible that the pixel regions are arranged in hexagon. In this case, each pixel region can have a hexagonal shape and each pixel region has six neighbouring pixel regions (neighbouring pixel regions at the top, at the bottom, at the top-left, at the top-right, at the bottom-left and at the bottom-right). In this case, N is 6.

Figure 12:
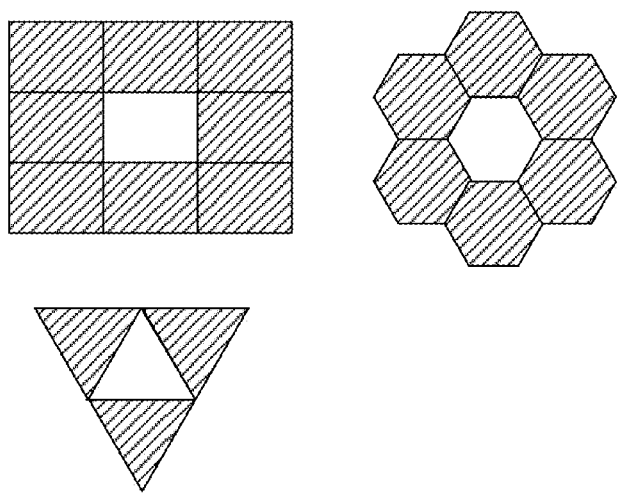
FIG. 12 shows examples of some possible shapes and arrangements of pixel regions that can be used with the first embodiment of the present invention.

FIG. 12 shows examples of some possible shapes and/or arrangements of pixel regions. In FIG. 12, the white polygons represent centre pixel regions, and hatched polygons represent neighbouring pixel regions of the centre pixel region.

Although some specific examples have been described for the shape and arrangement of the pixel regions, the pixel regions can have other shapes and/or arrangements (such as other arrangement of other polygons). Therefore, N should not be limited to any particular integer, but can be any integer equal to or larger than 3.

In an exemplary implementation of the present invention, the m-th N-bit binary code of the M pieces of N-bit binary codes represents neighbouring pixel regions which are in neighbourhood of the corresponding pixel region (centre pixel region) and have pixel region values within an m-th pixel region value range among M pixel region value ranges. In a case where each pixel region is constituted of one pixel, the pixel region value is a pixel value (intensity) of the pixel. In a case where each pixel region is constituted of a plurality of pixels, the pixel region value is a combined value of pixel values of said plurality of pixels in that pixel region. The combined value can be for example but not limited to one of an arithmetical average value, a geometric average value, a weighted average value, and a median value. Any other appropriate values can also be defined for the pixel region value.

A pixel value for a grey-scale image can be described in grey-scale levels. A pixel value for a colour image can be described as follows. More specifically, if the colour model of the colour image is an RGB model, a pixel value can be a value in any channel among Red, Green, and Blue channels. If the colour model of the colour image is an HSL model, a pixel value can be a value in any channel among Hue, Saturation and Luminance channels. Besides, since any colour in a colour image can be interpreted as a tuple of several colour channels, a pixel value can be a value in any colour channel of any colour model, including but not limited to the RGB model and the HSL model.

In an exemplary implementation of the present invention, N is equal to 8 and M is equal to 3. This corresponds to the case where the pixel regions are arranged in matrix. In this case, the M pieces of N-bit binary code are three 8-bit binary codes, and the M categories are three categories. The three categories can include, for example, a high pixel region value category, an intermediate pixel region value category and a low pixel region value category. More specifically, pixel region values of pixel regions corresponding to 8-bit binary codes of the high pixel region value category are within a first pixel region value range, pixel region values of pixel regions corresponding to 8-bit binary codes of the intermediate pixel region value category are within a second pixel region value range, and pixel region values of pixel regions corresponding to 8-bit binary codes of the low pixel region value category are within a third pixel region value range.

In an exemplary implementation of the present invention, for a given pixel region (centre pixel region), the first pixel region value range can be a pixel region value range for which a difference between a pixel region value therein and the pixel region value of the given pixel region is larger than a first threshold, the second pixel region value range can be a pixel region value range for which a difference between a pixel region value therein and the pixel region value of the given pixel region is not larger than the first threshold and not smaller than a second threshold, and the third pixel region value range can be a pixel region value range for which a difference between a pixel region value therein and the pixel region value of the given pixel region is smaller than the second threshold. In other words, neighbouring pixel regions in the first and third categories are significantly different from the centre pixel region in pixel region value, and neighbouring pixel regions in the second category are similar or substantially the same as the centre pixel region in pixel region value.

In an exemplary implementation of the present invention, the plurality of particular code patterns (salient code patterns) can include a first set of particular code patterns and a second set of particular code patterns. The first set of particular code patterns are constituted of a first subset of patterns and a second subset of patterns, and the second set of particular code patterns are constituted of a third subset of patterns.

In each 8-bit binary code of the first subset of patterns, changeover of a high level to a low level occurs at most once, and the changeover of a low level to a high level occurs at most once. The first subset of patterns can be applicable to the first and third categories in which the neighbouring pixel regions are much different from the centre pixel region in pixel region value. The patterns in the first subset of patterns are likely to correspond to a circle, an arc, a line, or a dot in an image.

Each 8-bit binary code of the second subset of patterns is a double-symmetric 8-bit binary code, wherein a pattern produced by arranging the double-symmetric 8-bit binary code at 8 positions that equally divide a circle is axial symmetric with respect to both axes of two mutually perpendicular directions. The second subset of patterns can be applicable to the first and third categories in which the neighbouring pixel regions are much different from the centre pixel region in pixel region value. The patterns in the second subset of patterns are likely to correspond to parallel lines in an image.

Each 8-bit binary code of the third subset of patterns is a symmetric 8-bit binary code, wherein a pattern produced by arranging the symmetric 8-bit binary code at 8 positions that equally divide a circle is axial symmetric with respect to an axis of at least one direction. The third subset of patterns can be applicable to the second category in which the neighbouring pixel regions can be deemed similar to or substantially the same as the centre pixel region in pixel region value. The patterns in the third subset of patterns are likely to correspond to a spot, a corner, a cross, or a line in an image.

Although a typical example of the particular code patterns is described above, the particular code patterns are not limited to this specific example. Actually, the definition of the particular code patterns for the salient N-bit-binary codes can be made in consideration of how structures of the image are most possibly like. That is to say, other particular code patterns can also be possible, as long as they reflect the typical structures of the image(s) to be described and exclude undesired structures which are likely to occur due to noise.

Although some specific examples in which M is equal to 3 and N is equal to 8 have been described in the above, it is to be noted that the values of N and M are not limited to the above examples. As described above, N can be an integer other than 8 if the pixel regions are arranged in a way different from a matrix. In addition, M can also be 4 or more, in which case the pixel region values of the neighbouring pixel regions can be classified into 4 or more categories by using three or more thresholds with respect to the centre pixel region. Particular code patterns corresponding to these categories as well as the specific correspondence between the particular code patterns and the categories can be designed accordingly.

Figure 13:
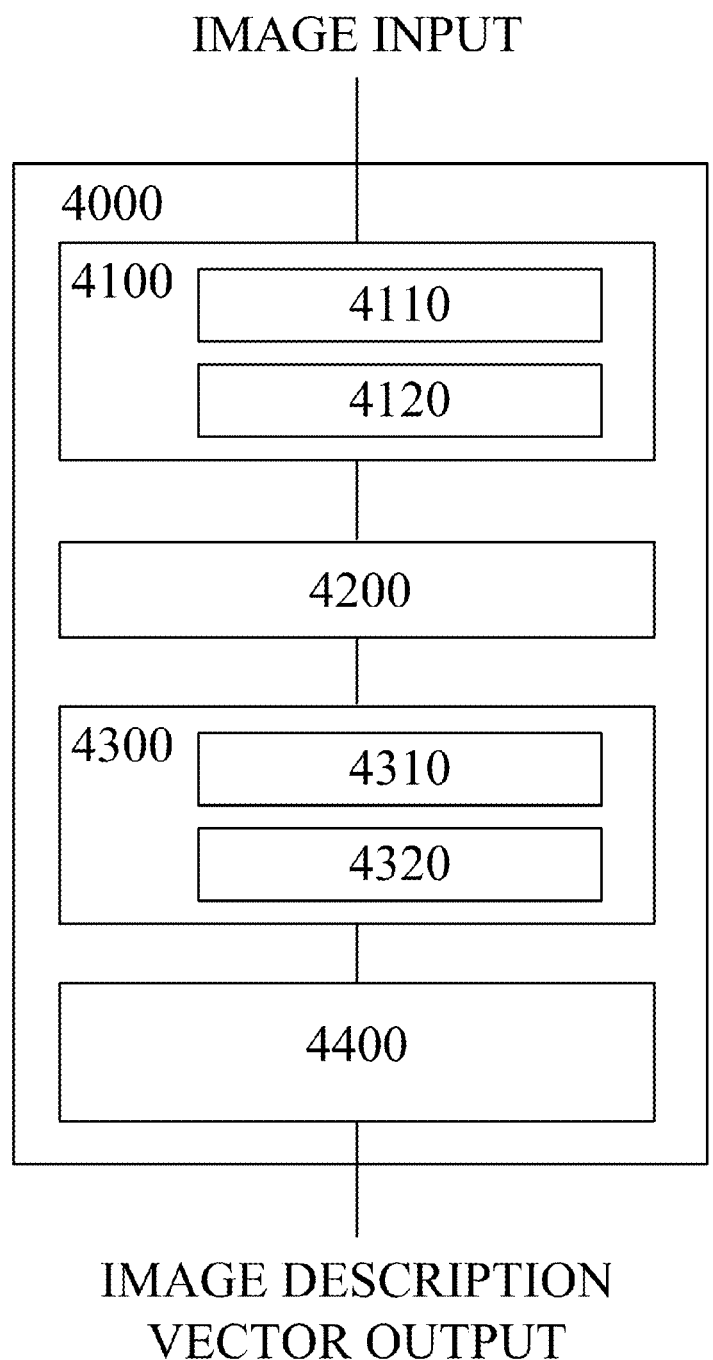
FIG. 13 is a schematic functional block diagram of the apparatus for generating an image description vector according to an exemplary embodiment of the present invention.
Figure 14:
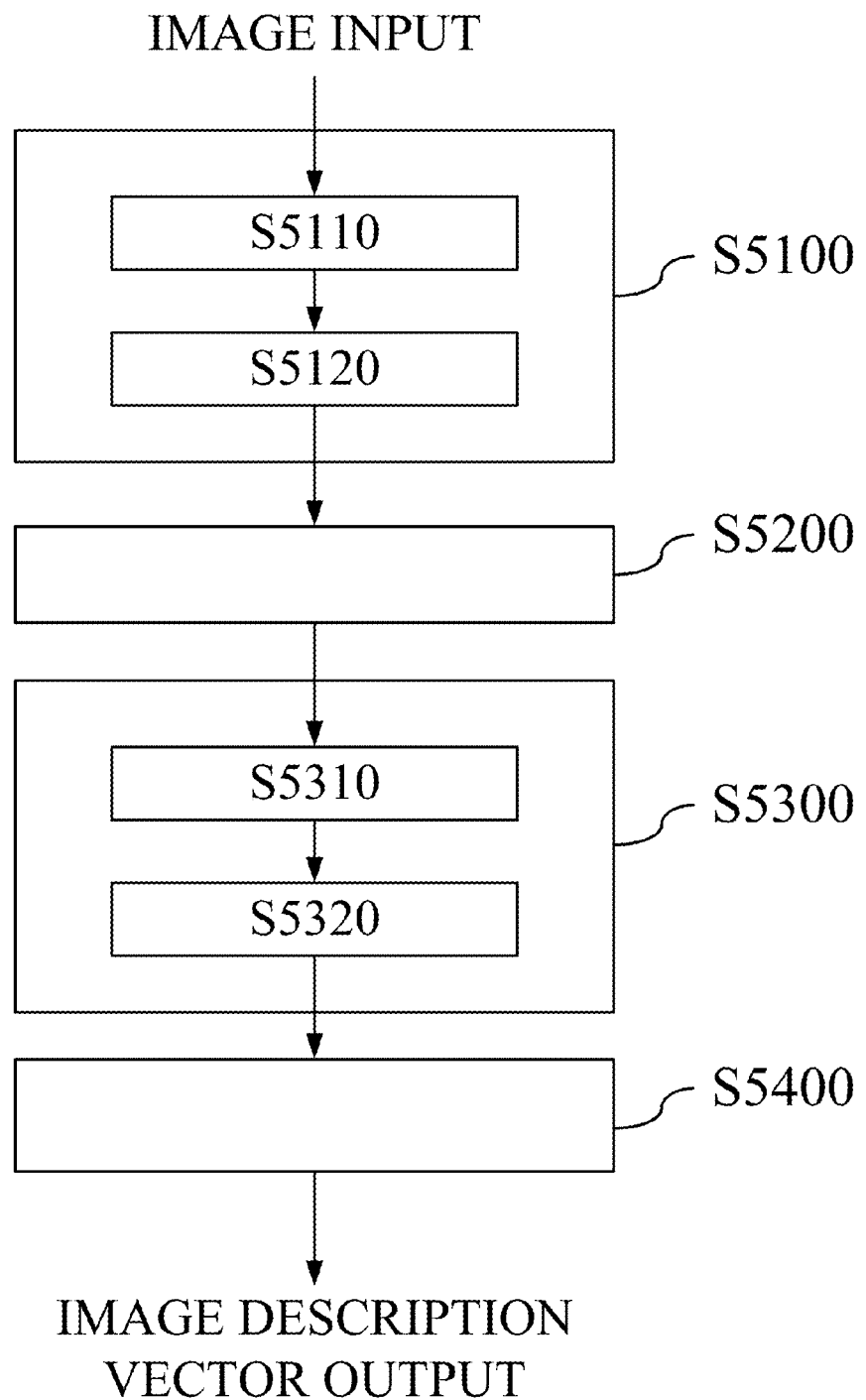
FIG. 14 is a schematic flowchart of the method for generating an image description vector according to an exemplary embodiment of the present invention.

Now an exemplary embodiment of the present invention will be described with reference to FIGS. 13 and 14. FIG. 13 is a schematic functional block diagram of the apparatus 4000 for generating an image description vector according to an exemplary embodiment of the present invention. FIG. 14 is a schematic flowchart of the method for generating an image description vector according to the exemplary embodiment of the present invention.

As shown in FIG. 13, the encoding unit 4100 can comprise: a ternary encoding sub-unit 4110 configured for encoding each of the plurality of pixel regions into a 8-bit ternary code; and a code transforming unit 4120 configured for transforming each 8-bit ternary code into the three 8-bit binary codes, wherein each 8-bit binary code of the three 8-bit binary codes corresponds to a level of the ternary levels.

More specifically, bits in the first 8-bit binary code which correspond to the high levels ("1") in the 8-bit ternary code can be set to "1", bits in the second 8-bit binary code which correspond to the middle levels ("0") in the 8-bit ternary code can be set to "1", and bits in the third 8-bit binary code which correspond to the low levels ("−1") in the 8-bit ternary code can be set to "1". In other words, the first 8-bit binary code indicates which bits of the 8-bit ternary code are in a high level, the second 8-bit binary code indicates which bits of the 8-bit ternary code are in a middle level, and the third 8-bit binary code indicates which bits of the 8-bit ternary code are in a low level.

For example, a pixel region is encoded into a 8-bit ternary code 111 (−1) (−1) 000 by the ternary encoding sub-unit 4110 and then the 8-bit ternary code is transformed by the code transforming unit 4120 to three 8-bit binary codes which are 11100000 corresponding to the high level ("1") of the ternary code, 00000111 corresponding to the middle level ("0") of the ternary code, and 00011000 corresponding to the low level ("−1") of the ternary code.

In the ternary encoding, the first level (high level) of the ternary levels can correspond to the high pixel region value category, the second level (middle level) of the ternary levels can correspond to the intermediate pixel region value category, and the third level (low level) of the ternary levels can correspond to the low pixel region value category. It is to be noted that the three levels "1", "−1" and "0" can be equivalently used and can be switched between each other, since they are actually three flags to represent three different categories or states.

For example, the LTP feature described above can be used as the 8-bit ternary code.

As shown in FIG. 13, the image description vector generating unit 4300 can comprise: a first sub-unit 4310 configured for, respectively for each category of the M categories, counting the number of salient N-bit binary codes which match respective code patterns of the plurality of particular code patterns, to form image description vector parts for respective categories; and a second sub-unit 4320 configured for cascading the image description vector parts of the M categories to form an image description vector.

Figure 15:
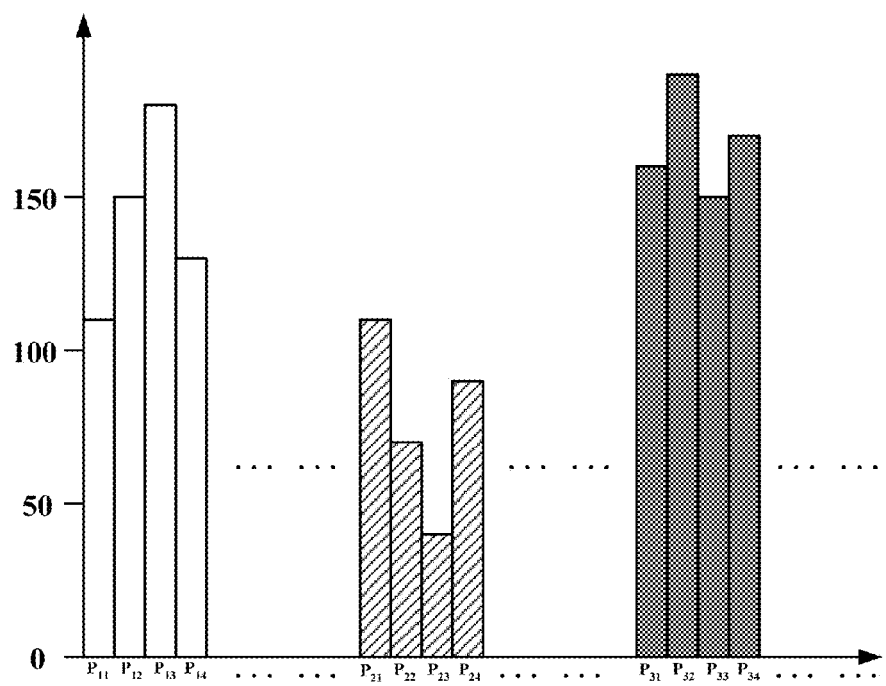
FIG. 15 is an exemplary graph for showing the image description vector obtained by the image description vector generating unit.

FIG. 15 is an exemplary graph for showing the image description vector obtained by the image description vector generating unit 4300. In FIG. 15, the vertical axis represents the count number of pixel regions, and the horizontal axis represents the specific code patterns of the salient N-bit binary codes (particular code patterns $P_{11}, P_{12}, P_{13}, P_{14}$ ... for the first category, particular code patterns $P_{21}, P_{22}, P_{23}, P_{24}$ ... for the second category, and particular code patterns $P_{31}, P_{32}, P_{33}, P_{34}$ ... for the third category, and so on). For example, the white bars in FIG. 15 represent the count number of pixel regions in the image for respective particular code patterns of the first category, the hatched bars in FIG. 15 represent the count number of pixel regions in the image for respective particular code patterns of the second category, and the solid bars in FIG. 15 represent the count number of pixel regions in the image for respective particular code patterns of the third category. Each bar corresponds to a specific particular code pattern (salient code pattern) of a respective category. For example, the first bar of the white bars represents that the count number of pixel regions in the image, whose N-bit binary code of the first category matches a specific salient code pattern $P_{11}$, is 110. Similarly, the third bar of the hatched bars represents that the count number of pixel regions in the image, whose N-bit binary code of the second category matches a specific salient code pattern $P_{23}$, is 40. The image description vector in FIG. 15 can be represented as (110, 150, 180, 130, ... 110, 70, 40, 90, ... 160, 190, 150, 170, ... ).

It is also possible to further cascade a bar, which represents the total count number of the non-salient N-bit-binary codes, to the vector shown in FIG. 15. In this case, the sum of the components in the vector can be M times the number of pixel regions in the image.

As shown in FIG. 13, the apparatus 4000 can further comprise a normalization unit 4400 configured for dividing the image description vector by the pixel region number of the plurality of pixel regions, to form a normalized image description vector. In this way, the image description vector can be insensitive to the whole number of pixel regions in the image.

Similarly, as shown in FIG. 14 the encoding step S5100 can comprise: a ternary encoding sub-step S5110 of encoding each of the plurality of pixel regions into a 8-bit ternary code; and a code transforming step S5120 of transforming each 8-bit ternary code into the three 8-bit binary codes, wherein each 8-bit binary code of the three 8-bit binary codes corresponds to one level of the ternary levels. The ternary encoding sub-step S5110 can be performed by the ternary encoding sub-unit 4110, and the code transforming step S5120 can be performed by the code transforming unit 4120.

The image description vector generating step S5300 can comprise: a first sub-step S5310 of, respectively for each category of the M category, counting the number of salient N-bit binary codes which match respective code patterns of the plurality of particular code patterns, to form image description vector parts for respective categories; and a second sub-step S5320 of cascading the image description vector parts of the M categories to form an image description vector. The first sub-step S5310 can be performed by the first sub-unit 4310, and second sub-step S5320 can be performed by the second sub-unit 4320.

The method according to the exemplary embodiment can further comprise a normalization step S5400 of dividing the image description vector by the pixel region number of the plurality of pixel regions, to form a normalized image description vector. The normalization step S5400 can be performed by the normalization unit 4400.

In some cases, a coarse structure of an image and a fine microstructure of the image can be greatly different. For example, a high resolution image has plenty of fine texture features but the overall contours may not be obvious. When the image is resized to a smaller scale (with lower resolution), detailed textures are lost and rough contours of the image emerge. That is to say, the image description under only one resolution might be not comprehensive. Therefore, it will be helpful to obtain a more comprehensive image description by using an image description vector of multi-resolution.

Figure 16:
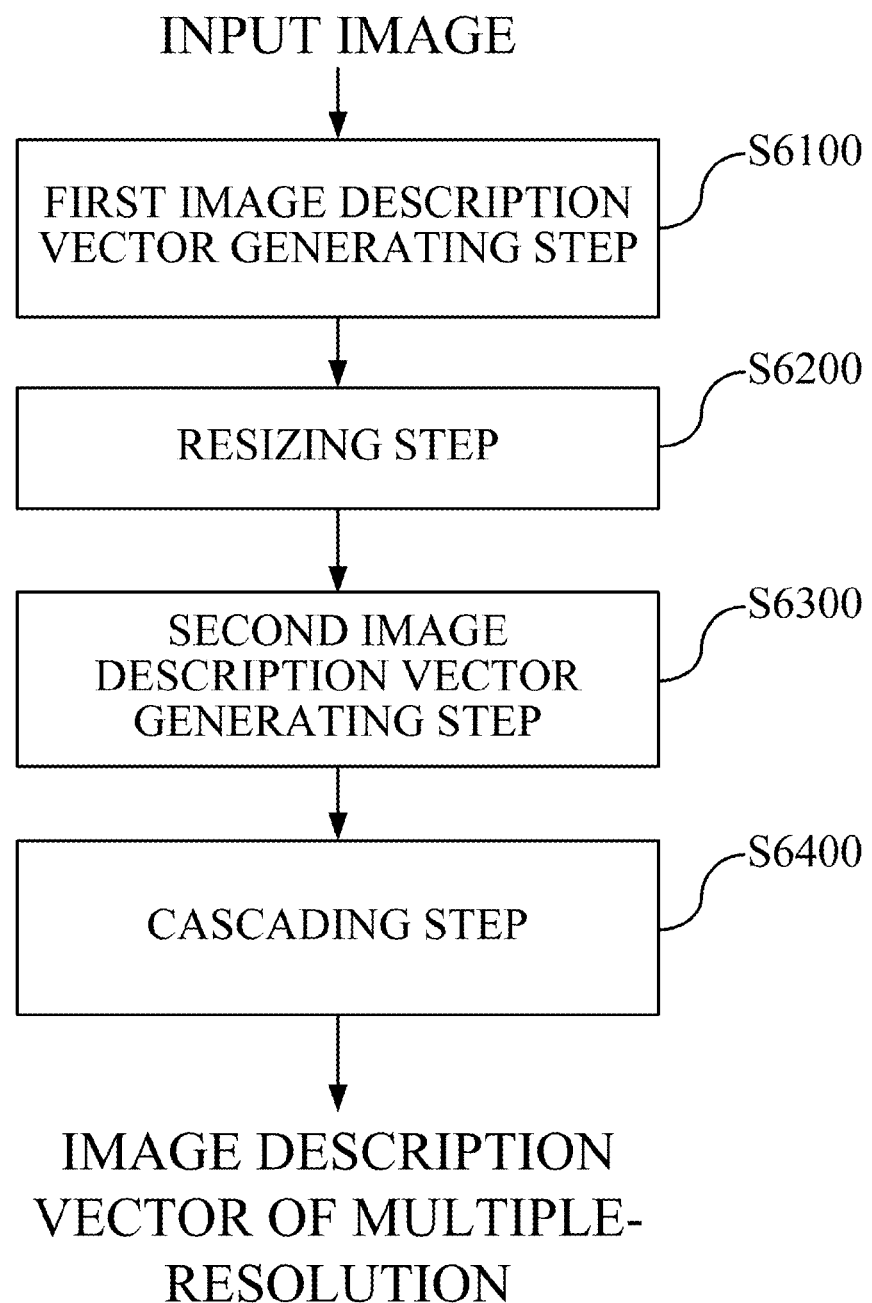
FIG. 16 is a schematic flowchart of a method for generating an image description vector of multi-resolution according to an exemplary embodiment of the present invention.

FIG. 16 is a flowchart of a method for generating an image description vector of multi-resolution according to an exemplary embodiment of the present invention.

As shown in FIG. 16, the method for generating an image description vector of multi-resolution comprises: a first image description vector generating step S6100 of generating a first image description vector by performing the method shown in FIG. 11 or 8 on an input image; a resizing step S6200 of resizing the input image to generate a resized image; a second image description vector generating step S6300 of generating a second image description vector by performing the method shown in FIG. 11 or 8 on the resized image; and a cascading step S6400 of cascading the first image description vector and the second image description vector to generate an image description vector of multi-resolution.

The resizing mentioned above means changing the resolution of the input image. For example, the resized image can have more pixels than the input image (enlarging) or fewer pixels than the input image (compressing). Many image resizing techniques have been known in the art, and will not be described here in any more detail.

It is possible to cascade two or three or even more image description vectors of different resolutions of one image to form the image description vector of multi-resolution for the one image.

Figure 17:
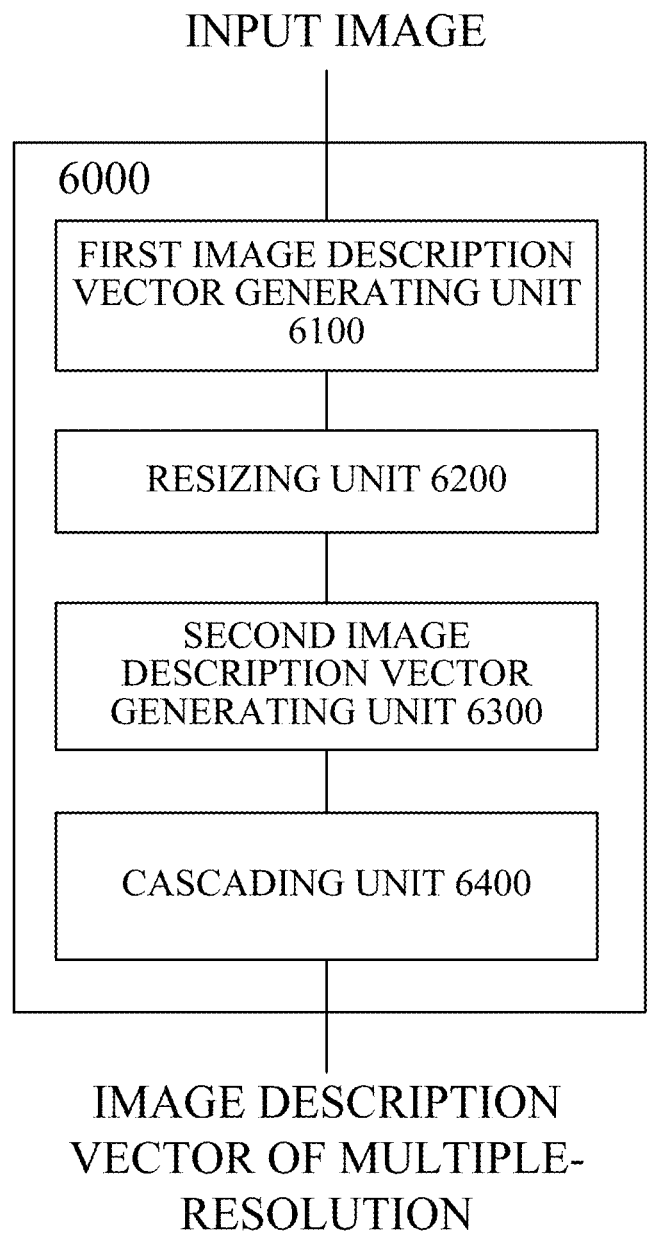
FIG. 17 is a schematic functional block diagram of the apparatus for generating an image description vector of multi-resolution according to an exemplary embodiment of the present invention.

FIG. 17 is a schematic functional block diagram of an apparatus 6000 for generating an image description vector of multi-resolution according to an exemplary embodiment of the present invention.

As shown in FIG. 17, the apparatus 6000 for generating an image description vector of multi-resolution comprises: a first image description vector generating unit 6100 configured for generating a first image description vector by performing the method shown in FIG. 11 or 8 on an input image; a resizing unit 6200 configured for resizing the input image to generate a resized image; a second image description vector generating unit 6300 configured for generating a second image description vector by performing the method shown in FIG. 11 or 8 on the resized image; and a cascading unit 6400 configured for cascading the first image description vector and the second image description vector to generate an image description vector of multi-resolution.

The units described above and units to be described below are exemplary and/or preferable modules for implementing the process described in the present disclosure. The modules can be hardware units (such as a field programmable gate array, a digital signal processor, an application specific integrated circuit, or the like) and/or software modules (such as a computer readable program). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the disclosure of the present application, as long as the technical solutions they constitute are complete and applicable.

Furthermore, the above apparatuses constituted of various units can be incorporated into a hardware device such as computer, as a functional module. The computer, as a matter of course, has other hardware or software components in addition to these functional modules.

In the following, an exemplary embodiment will be described in which the pixel regions in the image are arranged in matrix and neighbouring pixel regions of a pixel region include eight pixel regions which have that pixel region as a centre and form, together with that pixel region, a 3×3 matrix of pixel regions. In this case, N=8 and M=3.

For an input image including a plurality of pixel regions, in Step S5110, each of the plurality of pixel regions is encoded into an 8-bit ternary code.

Figure 18:
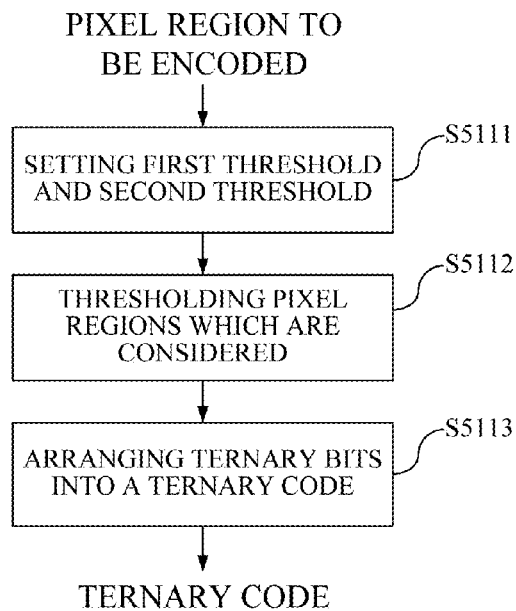
FIG. 18 is a schematic flowchart of an exemplary process performed in the ternary encoding sub-step according to an exemplary embodiment of the present invention.
Figure 19:
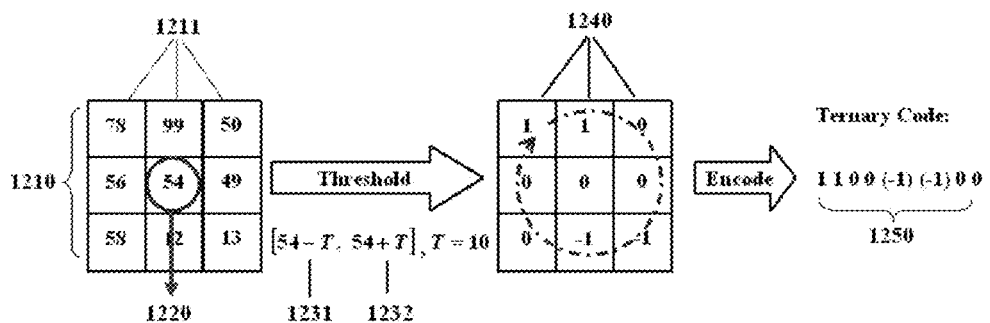
FIG. 19 shows an example for illustrating the process shown in FIG. 18.

FIG. 18 is flowchart of an exemplary process performed in the Step S5110. FIG. 19 shows an example for illustrating the process shown in FIG. 18.

As illustrated in FIG. 19, when a pixel region 1220 is to be encoded, a 3×3 image region 1210 with the pixel region 1220 as the centre is considered. The 3×3 image region 1210 includes the centre pixel region 1220 and eight neighbouring pixel regions 1211.

In step S5111, a margin T is used to set the lower threshold 1231 and the upper threshold 1232 with respect to the pixel region value of the centre pixel region 1220. This margin T can be predetermined according to the specific application. For example, the margin T can be predetermined according to the contrast of the image or the dynamic range of the pixel region values. In a case where the dynamic range of the pixel region values is large or the contrast of the image is high, the margin T can be set larger. In a case where the dynamic range of the pixel region values is small or the contrast of the image is low, the margin T can be set smaller. In addition, the margin T can be set depending on how pixel regions can be deemed as having "similar" pixel region values. The lower threshold 1231 is set to (centre pixel region value −T) and the upper threshold 1232 is set to (centre pixel region value +T). Here, T and −T are exemplary examples of the aforementioned first threshold and second threshold respectively. In the example shown in FIG. 19, the lower threshold 1231 is 54−10=44, and the upper threshold 1232 is 54+10=64.

In step S5112, each neighbouring pixel region undergo the upper and the lower thresholds, so as to be assigned with "1", "−1" or "0". More specifically, if a neighbouring pixel region has a pixel region value larger than the upper threshold (that is, a difference between the pixel region value of the neighbouring pixel region and the centre pixel region value is larger than the first threshold), this neighbouring pixel region is assigned with "1". If a neighbouring pixel region has a pixel region value not larger than the upper threshold and not smaller than the lower threshold (that is, a difference between the pixel region value of the neighbouring pixel region and the centre pixel region value is not larger than the first threshold and not smaller than the second threshold), this neighbouring pixel region is assigned with "0". If a neighbouring pixel region has a pixel region value smaller than the lower threshold (that is, a difference between the pixel region value of the neighbouring pixel region and the centre pixel region value is smaller than the second threshold), this neighbouring pixel region is assigned with "−1". In addition, the centre pixel region is assigned with "0". In other words, pixel regions assigned with "1" represent "lighter" pixel regions, pixel region assigned with "0" represent pixel regions which have substantially the same (or similar) pixel region values as the centre pixel region, and pixel regions assigned with "−1" represent "darker" pixel regions.

An example of pixel regions assigned with "0", "1" and "−1" is shown by reference sign 1240 in FIG. 19.

In step S5113, one of the neighbouring pixel regions are selected as the start point, and the ternary bits are arranged clockwise or anticlockwise to obtain a string of eight ternary bits as a ternary code 1250.

After the steps S5111 through S5113, an 8-bit ternary code for the centre pixel region is obtained. By performing steps S5111 through S5113 with each of the pixel regions in the image as the centre pixel region, each pixel region in the image can have a corresponding 8-bit ternary code.

Then in the code transforming step S5120, each 8-bit ternary code is transformed into three 8-bit binary codes each of which corresponds to one level of the ternary levels.

Figure 20:
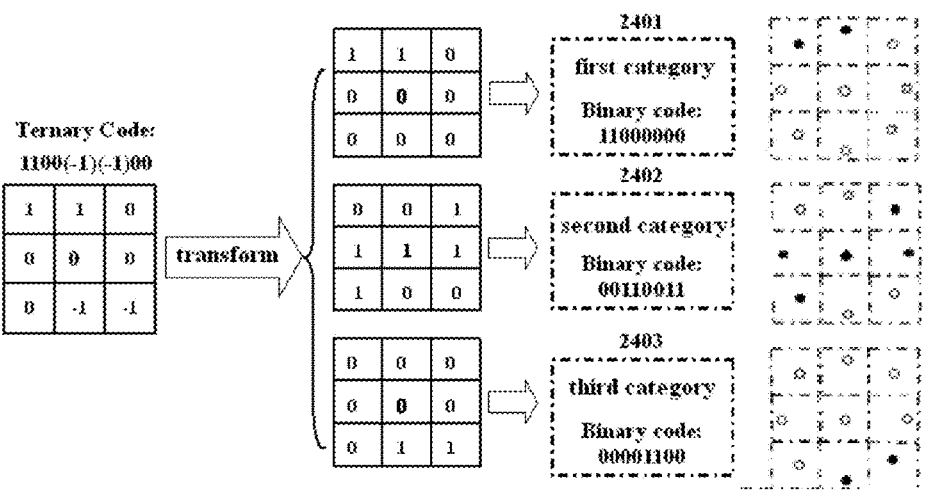
FIG. 20 shows an example for illustrating the process in the code transforming step according to the exemplary embodiment of the present invention.

FIG. 20 shows an example for illustrating the process in the code transforming step S5120.

As shown in FIG. 20, an 8-bit ternary code is transformed into three 8-bit binary codes of three categories. Each of the three categories corresponds to a threshold range. The first category corresponds to pixel regions assigned with "1", the second category corresponds to pixel regions assigned with "0", and the third category corresponds to pixel regions assigned with "−1". The 8-bit binary code of the first category is generated by keeping all "1" in the ternary code and changing other bits to "0". The 8-bit binary code of the second category is generated by changing all "0" in the ternary code to "1" and changing other bits to "0". The 8-bit binary code of the third category is generated by changing all "−1" in the ternary code to "1" and changing other bits to "0", as shown in FIG. 20.

FIG. 20 also shows away to represent an 8-bit binary code. More specifically, an 8-bit binary code can be represented as eight dots arranged on eight positions which equally divide a circle. In FIG. 20 and the following figures, black dots represent bits "1", and white dots represent bits "0". Each dot reveals the position and pixel region value of the corresponding pixel region relative to the centre pixel region.

Then in step S5200, salient 8-bit binary codes are extracted from all the 8-bit binary codes obtained in the step S5100. As described above, the 8-bit binary codes are classified into three categories, that is, the first, the second, and the third categories.

There are a total of 256 binary code patterns for each category based on the 8-bit binary encoding schema. For the three categories, there are 256×3=768 binary code patterns altogether. However, among the 256 binary code patterns, it is always the case that only a small proportion of the binary code patterns have significant image features, and others may be considered as noise.

In this exemplary embodiment, the input images have a characteristic that the pixel region values change gradually and distinctive image features are continuous. Based on this characteristic, salient binary code patterns are designed and selected. The selection of salient binary code patterns in this exemplary embodiment is only an example. It is also possible that images in other examples have other characteristics, and the salient binary code patterns can be designed and selected in consideration of the specific characteristics of the images to be described.

For an 8-bit binary code of the first category, if the 8-bit binary code matches a code pattern in a first set of particular code patterns, the 8-bit binary code is extracted as a salient 8-bit binary code of the first category. For an 8-bit binary code of the second category, if the 8-bit binary code matches a code pattern in a second set of particular code patterns, the 8-bit binary code is extracted as a salient 8-bit binary code of the second category. For an 8-bit binary code of the third category, if the 8-bit binary code matches a code pattern in the first set of particular code patterns, the 8-bit binary code is extracted as a salient 8-bit binary code of the third category.

An example of the first and second set of particular code patterns will be described in more detail in the following.

Figure 21:
FIG. 21 shows an example of salient image features (salient binary code patterns) for the first and third categories according to the exemplary embodiment of the present invention.

In this exemplary embodiment, the first category represents lighter features (pixel regions having larger pixel region values) surrounding the centre pixel region, and the third category represents darker features (pixel regions having smaller pixel region values) surrounding the centre pixel region. Thus, pixel regions in the first and third categories have the common characteristic that the pixel regions are remarkably different from the centre pixel region, in other words, they both reveal the local neighbouring microstructure around the centre pixel region. Based on the characteristic of images in this exemplary embodiment, the salient image features in these two categories can be an edge, a line, an arc, a circle, a dot or the like, as shown in FIG. 21. FIG. 21 shows salient image features (binary code patterns) for the first and third categories, in which a black dot means that the corresponding pixel region is a feature point (bit "1" in the binary code). Binary code patterns which are obtained by rotation of the salient code patterns shown in FIG. 21 are still salient code patterns. That is to say, the first set of particular code patterns (salient code patterns for the first and third categories) include the code patterns shown in FIG. 21 and their rotated versions.

It can be seen from FIG. 21 that the first set of particular code patterns can be constituted of a first subset of patterns and a second subset of patterns. In each 8-bit binary code of the first subset of patterns, changeover of a high level to a low level occurs at most once, and the changeover of a low level to a high level occurs at most once. In other words, the patterns in the first subset of patterns have only one continuous "1" bit set at most and only one continuous "0" bit set at most. Each 8-bit binary code of the second subset of patterns is a double-symmetric 8-bit binary code. For the double-symmetric 8-bit binary code, a pattern produced by arranging the double-symmetric 8-bit binary code at 8 positions that equally divide the circle is axial symmetric with respect to both axes of two mutually perpendicular directions.

It can be seen that in this exemplary embodiment, there are a total of 69 specific particular code patterns (including the code patterns shown in FIG. 21 and their rotated versions) in the first set of particular code patterns used for the first and third categories respectively. That is to say, 256−69=187 other code patterns will be deemed as noise code patterns.

Figure 22:
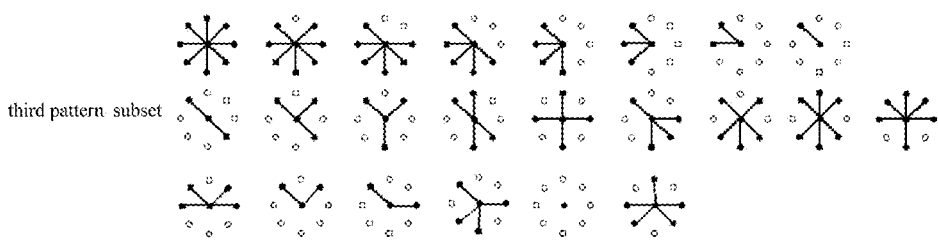
FIG. 22 shows an example of salient image features (salient binary code patterns) for the second category according to the exemplary embodiment of the present invention.

In this exemplary embodiment, the 8-bit binary codes of the second category represent pixel regions which are in the same pixel region value range to the centre pixel region. Since the centre pixel region has similar pixel region value as the neighbouring pixel regions of the second category, the centre pixel region can also be considered as a feature point for the second category. Based on the characteristic of images in this exemplary embodiment, the salient image features in the second category can be an a patch, a spot, a corner, cross lines, an edge or the like, as shown in FIG. 22. FIG. 22 shows salient image features (salient binary code patterns) for the second category, in which a black dot means that the corresponding pixel region is a feature point (bit "1" in the binary code). Binary patterns which are obtained by rotation of the salient code patterns shown in FIG. 22 are still salient code patterns. That is to say, the second set of particular code patterns (salient code patterns for the second category) include the code patterns shown in FIG. 22 and their rotated versions.

The second set of particular code patterns can be constituted of a third subset of patterns. It can be seen that each 8-bit binary code of the third subset of patterns is a symmetric 8-bit binary code. For the symmetric 8-bit binary code, a pattern produced by arranging the symmetric 8-bit binary code at 8 positions that equally divide the circle is axial symmetric with respect to an axis of at least one direction.

It can be seen that in this exemplary embodiment, there are a total of 152 specific particular code patterns (including the code patterns shown in FIG. 22 and their rotated versions) in the second set of particular code pattern used for the second category. That is to say, 256−152=104 other code patterns will be deemed as noise code patterns.

As described above, since only salient code patterns are used to describe the 8-bit binary codes in each of the first through third categories, the efficiency of describing an image is improved. In addition, since one pixel region is described with three different categories of 8-bit binary codes, and the 8-bit binary codes of different categories are processed separately, the image can be described more accurately and more finely.

After all the salient 8-bit binary codes have been extracted, in the step S5310, the number of salient 8-bit binary codes for each of the categories is counted for each of the specific salient code patterns corresponding to that category. For each category, an image description vector part is formed by cascading count numbers for each specific code pattern of that category.

Then in the step S5320, respective image description vector parts of the three categories are cascaded as an image description vector.

It is possible to represent the image description vector as a histogram, in which each bin represents a specific salient code pattern, the bins are arranged by different categories, and each bar represents the count number corresponding to the bin. It is also possible that a bin representing all non-salient 8-bit binary code patterns is cascaded to the bins representing the salient code patterns, and/or it is also possible that the histogram is normalized by the number of processed pixel regions in the image.

It is also possible that the salient code patterns are quantized into decimal values in order to be stored for use. For example, the salient code pattern 01100110 for the second category can be quantized as "102".

It is also possible to resize the image (change the resolution of the image) and apply the process shown in FIG. 11 or 14 to the resized image, as shown in FIG. 16 described in the above, so as to obtain an image description vector of multi-resolution.

Figure 23A:
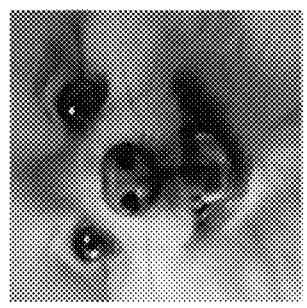
FIGS. 23A and 23B show an illustrative example of an original image and the image description vector generated for the original image according to an exemplary embodiment of the present invention.
Figure 23B:
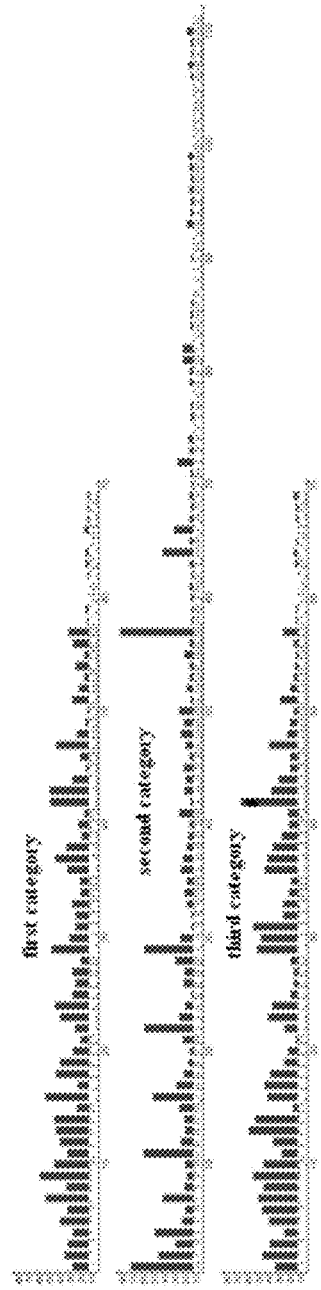

FIG. 23A shows an illustrative example of an original image. The salient patterns and the image description vector generated according to one embodiment described above are shown in FIG. 23B.

As described above, the image description method according to the present invention can describe an image more efficiently with more detailed and accurate local structures of the image. Therefore, it can be suitably used in object detection, recognition, tracking, and retrieval for images and videos.

[Second Embodiment]

Figure 24:
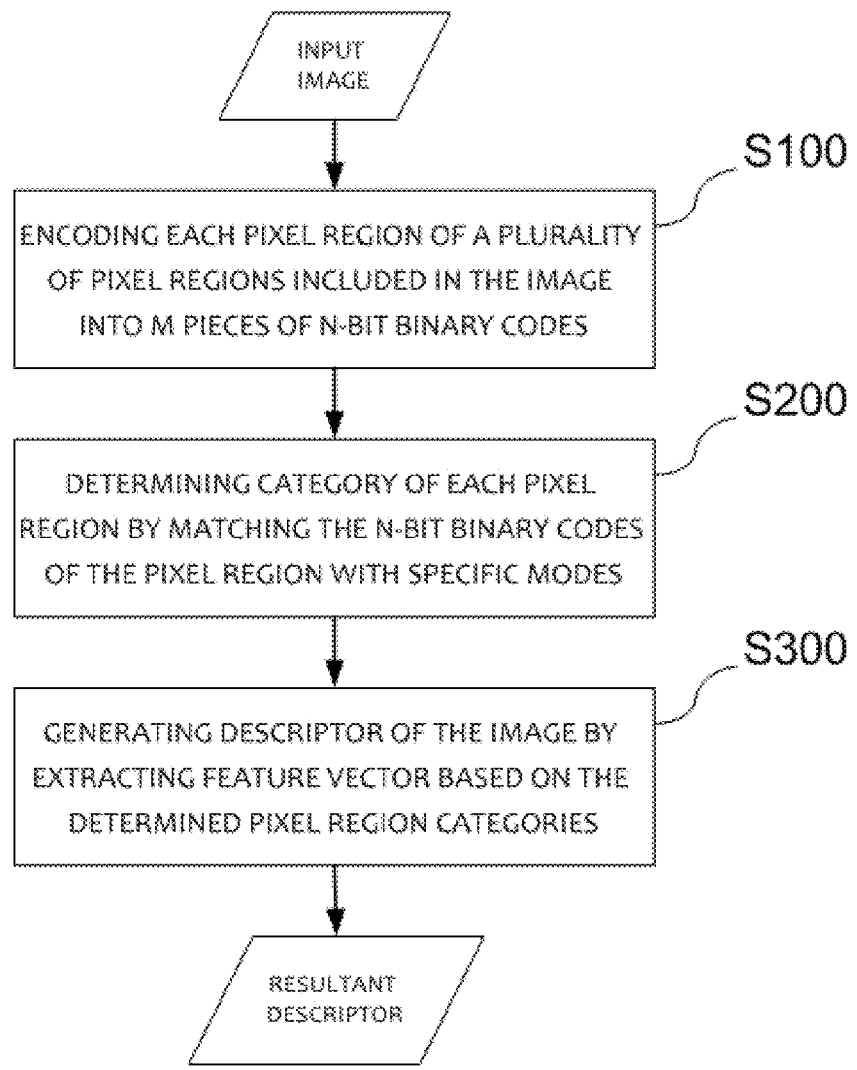
FIG. 24 is a flow chart illustrating a method for generating a descriptor of an image according to the second embodiment of the present invention.

Hereinafter, a method and apparatus for generating a descriptor of an image according to the second embodiment of the present invention will be described with reference to the drawings, and FIG. 24 is a flowchart illustrating a method for generating a descriptor of an image according to the second embodiment of the present invention.

Generally, an image including an object to be detected or recognized can comprise a plurality of pixel regions, and each of the plurality of pixel regions can include one or more pixels.

In step S100 (hereinafter to be referred to as encoding step) of the method, with respect to each pixel region of the plurality of pixel regions, the pixel region is encoded into M pieces of N-bit binary codes, wherein each bit in each N-bit binary code corresponds to each of a plurality of neighboring pixel regions of the pixel region.

In step S200 (hereinafter to be referred to as region category determining step), with respect to each pixel region whose category is to be determined of the plurality of pixel regions, at least one N-bit binary codes of the M pieces of N-bit binary codes of the pixel region whose category is to be determined are matched with a corresponding specific mode of a plurality of specific modes, to determine the pixel region category of the pixel region.

In step S300 (hereinafter to be referred to as descriptor generating step) the descriptor of the image is generated based on pixel region categories determined in the region category determining step by utilizing feature vector extraction.

Here, the specific mode corresponding to the foregoing described particular code pattern.

Furthermore, the step S300 and step S200 can be included in the above described generating step of the present invention.

In the method, M may be an integer which is more than or equal to one, and N is an integer which is more than or equal to three.

Herein, a neighboring pixel region of a pixel region is usually located around the pixel region and immediately adjacent to the pixel region. The size of the neighboring pixel region may generally be the same as that of the pixel region, however, their size may be different as long as similar determining result can be achieved, and can be selected by the operator according to the actual operation environment, performance requirement, etc. A pixel region generally includes a plurality of neighboring pixel regions, and the number of the neighboring pixel regions can vary depending on the shape of the pixel region, the actual operation environment, etc, and can be arbitrarily choosed by the operator. Furthermore, the position of the neighboring pixel regions also can be determined by the operator according to the actual operational environment, performance requirement, etc.

In a prefer implementation, the plurality of neighboring pixel regions of the pixel region are eight pixel regions which forms a 3*3 pixel region array together with the pixel region with the pixel region as the center, and the 3*3 pixel region array is in a rectangular shape.

Next, we would describe each of step S100 to S300 of the method according to the second embodiment of the present invention with reference to the drawings.

Firstly, the encoding step will be described in detail.

The encoding step can encode each pixel region of a plurality of pixel regions into M pieces of N-bit binary codes. Among the M pieces of N-bit binary codes, m-th N-bit binary code indicates neighboring pixel regions whose pixel region value each is in m-th pixel region value range among M pixel region value ranges, and value of each bit in the m-th N-bit binary code corresponding to each of the neighboring pixel regions is a binary specific level, and wherein, $1 \leq m \leq M$. In the binary manner, a binary specific level usually is "1" in the binary notation. Of course, the binary specific level can also be "0" without departing from the scope of the present invention and can still achieve the similar effect. In an prefer embodiment, M is 3 and N is 8, and thus M pieces of N-bit binary codes correspond to 3 pieces of 8-bit binary codes.

Each of the M pixel region value ranges can be obtained based on the pixel region value of the pixel region which is to be encoded, and usually is obtained by combining the pixel region value of the pixel region and one or more corresponding thresholds.

The M pieces of N-bit binary codes for a pixel region can be directly or indirectly obtained based on the pixel region values of the pixel region and that of the neighboring pixel regions of the pixel region.

In a direct manner, M pieces N-bit binary codes for a pixel region can be directly obtained by, with respect to each of neighboring pixel regions of the pixel region, determining the N-bit binary code among the M pieces of N-bit binary codes to which the neighboring pixel region is related by comparing the pixel region value of the neighboring pixel region and the M pixel region value ranges, and setting the value of the bit in the N-bit binary code corresponding to the neighboring pixel region as the specific binary level, such as "1", based on the determining result.

Alternatively, the M pieces N-bit binary codes of a pixel region can be obtained in an indirect manner. The indirect manner means that the M pieces N-bit binary codes of a pixel region can be obtained from other form of code of the pixel region which is previously obtained. In a prefer implementation, the M pieces N-bit binary codes for a pixel region can be indirectly obtained via a ternary code for the pixel region, and the ternary code can also be obtained based on the pixel region values of the pixel region and that of the neighboring pixel regions of the pixel region, and then be transformed into the M pieces of N-bit binary codes.

Herein, the ternary code can be obtained by a plurality of techniques. One of them is LTP (Local Ternary Pattern)-based method. LTP is a powerful local texture descriptor which represents the local intensity contrast and has widely used in image recognition, and LTP is more computation efficient. LTP-based method can be known from Xiaoyang Tan and Bill Triggs, "Enhanced Local Texture Feature Sets for Face Recognition Under Difficult Lighting Conditions", IEEE Transactions on Image Processing, pp. 1635-1650, 19 (6), 2010, T. Ojala, M. Pietikainen and T. Maenpaa, "Multi-resolution Gray-Scale and Rotation Invariant Texture Classification with Local Binary Patterns", IEEE Transaction on pattern analysis and machine intelligence, 24 (7), 2002, for example. And in the present invention, the local computation structure and double thresholds in LTP makes the pixel regions whose category has been determined being more stable and robustness against large illumination variant and noise. However, it is clear that other method for generating the ternary code can be used.

Figure 25:
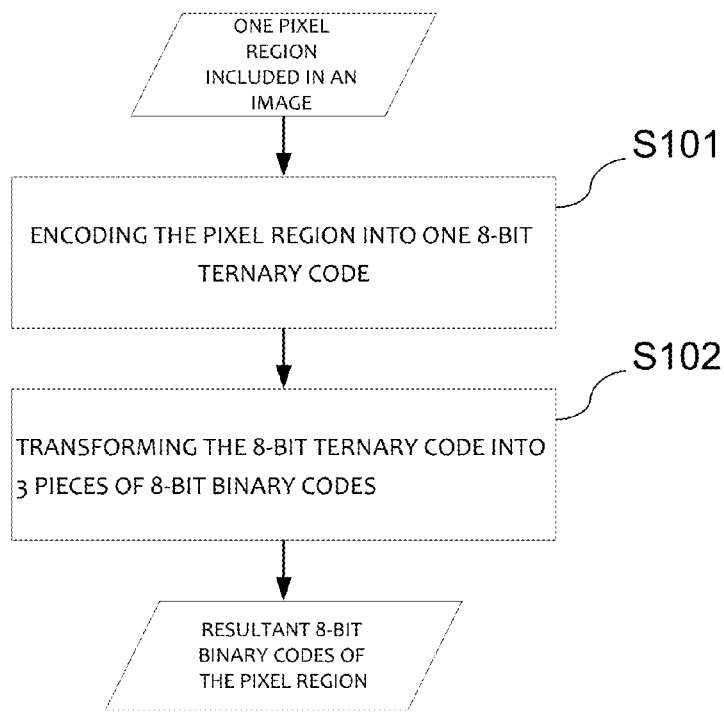
FIG. 25 is a flowchart illustrating the process of encoding step in FIG. 24.

FIG. 25 schematically illustrates an indirect manner of the encoding step in the case that M=3 and N=8.

In step S101 (hereinafter to be referred as ternary code encoding sub-step), the pixel region is encoded into one 8-bit ternary code, wherein each bit in the 8-bit ternary code corresponds to each of eight neighboring pixel regions of the pixel region. In the one 8-bit ternary code, a bit whose value is m-th level in the ternary notation indicates a neighboring pixel region whose pixel region value is located in m-th pixel region value range among three pixel region value ranges among the eight neighboring pixel regions.

The three pixel region value ranges can include first pixel region value range, second pixel region value range, and third pixel region value range. The first pixel region value range is a range in which the difference between the pixel region value of a neighboring pixel region and the pixel region value of the pixel region is larger than first threshold, the second pixel region value range is a range in which the difference between the pixel region value of a neighboring pixel region and the pixel region value of the pixel is not larger than the first threshold and not smaller than the second threshold, and the third pixel region value range is a range in which the difference between the pixel region value of a neighboring pixel region and the pixel region values is smaller than the second threshold.

In step S102 (hereinafter to be referred to as code transforming step), the one 8-bit ternary code can be transformed into the 3 pieces of 8-bit binary codes. In a prefer embodiment, the code transforming step comprises reflecting a bit whose value is m-th level in the one 8-bit ternary code into m-th 8-bit binary code, and the value of the corresponding bit in the m-th 8-bit binary code is a specific level in the binary notation.

And, in the above described encoding step, let 1≤m≤3.

Figure 26:
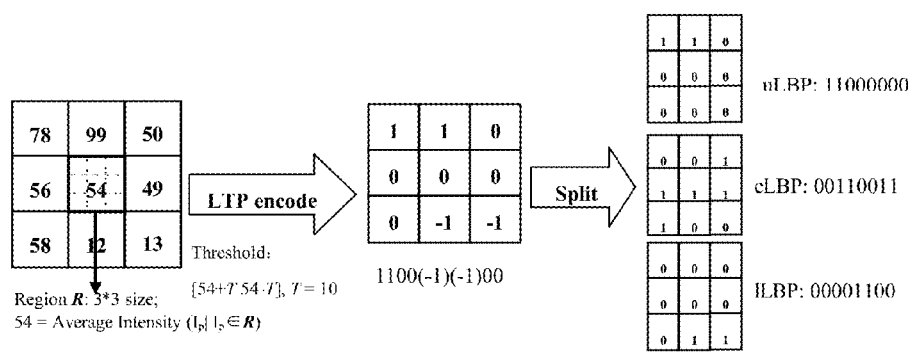
FIG. 26 illustrates an example of the process of encoding step.

Hereinafter, the encoding step based on LTP will be described in detail with reference to the numbers shown in FIG. 26 so that the process of encoding step is more liable to be understood. Firstly, as shown in FIG. 26, a 3*3 encoding structure is specified for the selected pixel regions which include the pixel region to be encoded as center region and eight equal-sized neighboring pixel regions, the pixel region may be S*S region, wherein S is the specified region scale and corresponds to pixel count. Then, average pixel region value, such as, value corresponding to intensity, is got for each pixel region. Average pixel region value of a pixel region is usually determined from all pixels included in the pixel region. As shown in FIG. 26, each number illustrated in the 3*3 array represents the average pixel region value of the corresponding pixel region, respectively.

Then, LTP code of the center pixel region is obtained based on the average pixel region values of the pixel region and its neighboring pixel regions. More specifically, as shown in FIG. 26, the codes of neighboring regions are determined based on the center pixel region's average pixel region value and a tolerant constant T, which can be arbitrarily set manually according to the actual operational environment, performance requirement, etc and is set as 10 in FIG. 26.

When the difference between average pixel region value of a neighboring pixel region and of the center pixel region is larger than T, that is, 10, the neighboring pixel region will be assigned "1" in the LTP code. This may means that the pixel region value of the neighboring pixel region is located in the first pixel region value range, and in this case, constant T corresponds to the first threshold.

When the difference between the average pixel region value of a neighboring pixel region and of the center pixel region is equal to or smaller than 10 and equal to or larger than −T, that is, −10, the neighboring pixel region will be assigned "0" in the LTP code. This may means that the pixel region value of the neighboring pixel region is located in the second pixel region value range, and in this case, the value '−T' corresponds to the second threshold.

When the difference between the average pixel region value of a neighboring pixel region and of the center pixel region is smaller than −10, the neighboring pixel region will be assigned "−1" in the LTP code. This may means that the pixel region value of the neighboring pixel region is located in the third pixel region value range.

Naturally, the first threshold and second threshold can be other values.

Finally, the LTP code will be split into 3 LBP (local binary pattern) codes corresponding to the 3 pieces of 8-bit binary codes of the center pixel, which may include uLBP (the upper LBP), cLBP (the center LBP) and lLBP (the lower LBP) codes, wherein, uLBP code may reflect the lighter pixel regions' arrangement, that is, the uLBP represents the neighboring pixel regions whose pixel region value is located in the first pixel region value range and may be deemed light enough, cLBP code may reflect the arrangement of pixel regions which have similar intensity with the center region, that is, the cLBP represents the neighboring pixel regions whose pixel region value is located in the second pixel region range, and lLBP code reflects the darker pixel regions' arrangement, that is, the lLBP represents the neighboring pixel regions whose pixel region value is located in the third pixel region range and may be deemed dark enough.

Hereinafter, the region category determining step will be described with reference to FIG. 27.

In the present invention, the pixel region can be determined whether it is a salient region (first pixel region category) or a non-salient region (second pixel region category). Salient region is most appearance different from its neighboring regions, and robust and repeatable against illumination variant, view-point change, and non-rigid deformation. Therefore, it is feature independent. That is, it can at least be independent of quantization.

In step S201, with respect to each pixel region whose category is to be determined among the plurality of pixel regions, the category of the pixel region is determined by matching the N-bit binary codes of the pixel region with a plurality of specific modes.

In the present invention, the plurality of specific modes are pre-defined. In a prefer implementation, the plurality of specific modes correspond to a set of pattern with significant features which represents the salient local contrast and define significant LBP patterns, wherein the significant LBP patterns may be significant rotation-invariant LBP patterns and may have continuous or symmetric characteristics, and only the pixel region whose neighboring pixel regions arrangement in LBP codes comply with the pre-defined significant LBP patterns will be regarded as a salient region.

In the present invention, the plurality of specific modes include first specific mode and second specific mode, the first specific mode corresponding to the first and third 8-bit binary codes and the second specific mode corresponding to the second 8-bit binary code. The first specific mode is a mode in which a pattern formed by respective specific-level bits included in a 8-bit binary code positioned in corresponding circular 8-equidistant positions is one point or one continuous line, and the second specific mode is a mode in which a pattern formed by respective specific-level bits included a 8-bit binary code positioned in corresponding circular 8-equidistant positions is symmetric with respect to the centre of the circle or at least one axis, any of the at least one axis passes through the center of the circle.

FIGS. 10A and 10B illustrate some specific patterns included in the first specific mode and second specific mode, respectively. It is clear that other patterns other than the patterns shown in FIGS. 10A and 10B are possible, as long as they comply with the above definition of the first and second specific mode.

Figure 28A:
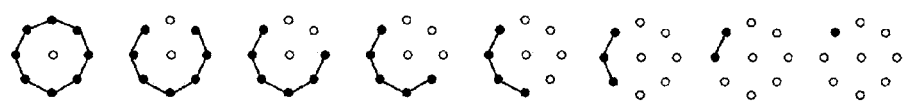

FIG. 28A illustrates some patterns included in the first specific mode, which may be referred to as Neighbor-significant LBP patterns for uLBP and lLBP codes. The Neighbor-significant LBP pattern may be one point or continuous curve and represent spot and corner features. For uLBP and lLBP codes, the corresponding neighboring pixel regions are much different from center pixel region, and effective LBP patterns are those curve and spot as shown.

Figure 28B:
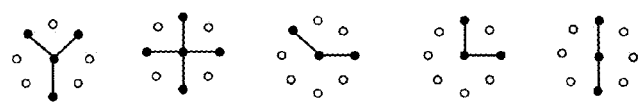

FIG. 28B illustrates some patterns included in the second specific mode, which may be referred to as Center-significant LBP patterns for cLBP. The Center-significant LBP pattern may be a pattern which is symmetric with respect to the center of the circle or at least one axis and represents junction, line, and arc feature. The axis represents any axis passing though the circular center. For cLBP code, the center pixel region is in the same threshold scope with neighboring pixel regions, they make significant image features together. Thus, the efficient patterns corresponding to this code are axis symmetric patterns.

The step S201 can be implemented as follows. With respect to each pixel region whose category is to be determined among the plurality of pixel regions, in a case in which all bits included in one of the first 8-bit binary code and third 8-bit binary code thereof are not a specific level in binary notation and the other 8-bit binary code matches with the first specific mode, or in a case other than the case, the second 8-bit binary code of the pixel region matches with the second specific mode, determining the pixel region as belonging to the first pixel region category, else, determining the pixel region as belonging to the second pixel region category.

More specifically, When the pixel region's three LBP codes include uLBP (lLBP) but not lLBP (uLBP), which means there's pixel region being enough lighter (darker) than the selected pixel region and there's no pixel region being enough darker (lighter) than the selected region among its 3*3 neighboring regions, only when the pattern of the existing uLBP (lLBP) code belongs to the pre-defined Neighbor-significant LBP patterns set, the region is salient; In other cases, when the pattern of cLBP code belongs to the pre-defined Center-significant LBP pattern set, the selected region is salient.

Alternatively, other category determining manner can be used without significantly reducing the category determining effect. One possible manner is only to utilize the uLBP or lLBP code of a pixel region. In such a manner, the uLBP or lLBP code will be compared with the first specific mode as described above so as to determine the category of the pixel region. In this case, the M pieces of N-bit binary codes of a pixel region will be two N-bit binary codes. The two pixel region value ranges to be used for determining the two N-bit binary codes may correspond to the first and third pixel region value ranges as described above, respectively.

Another possible manner is only to utilize the cLBP code of the pixel region. In such a manner, the cLBP code will be compared with the second specific mode as described above so as to determine the category of the pixel region. In this case, the M pieces of N-bit binary codes of a pixel region will be one N-bit binary code. The one pixel region value range to be used for determining the one N-bit binary code may correspond to the second pixel region value range as described above.

Furthermore, note that the above category determination is directed to the pixel regions other than border pixel regions included in the image. In a prefer embodiment, the border pixel regions included in the image belong to a second pixel region category.

In a preferred embodiment, the region category determining step further comprises a step of further classifying the pixel regions belonging to the first pixel region category (salient regions).

Figure 27:
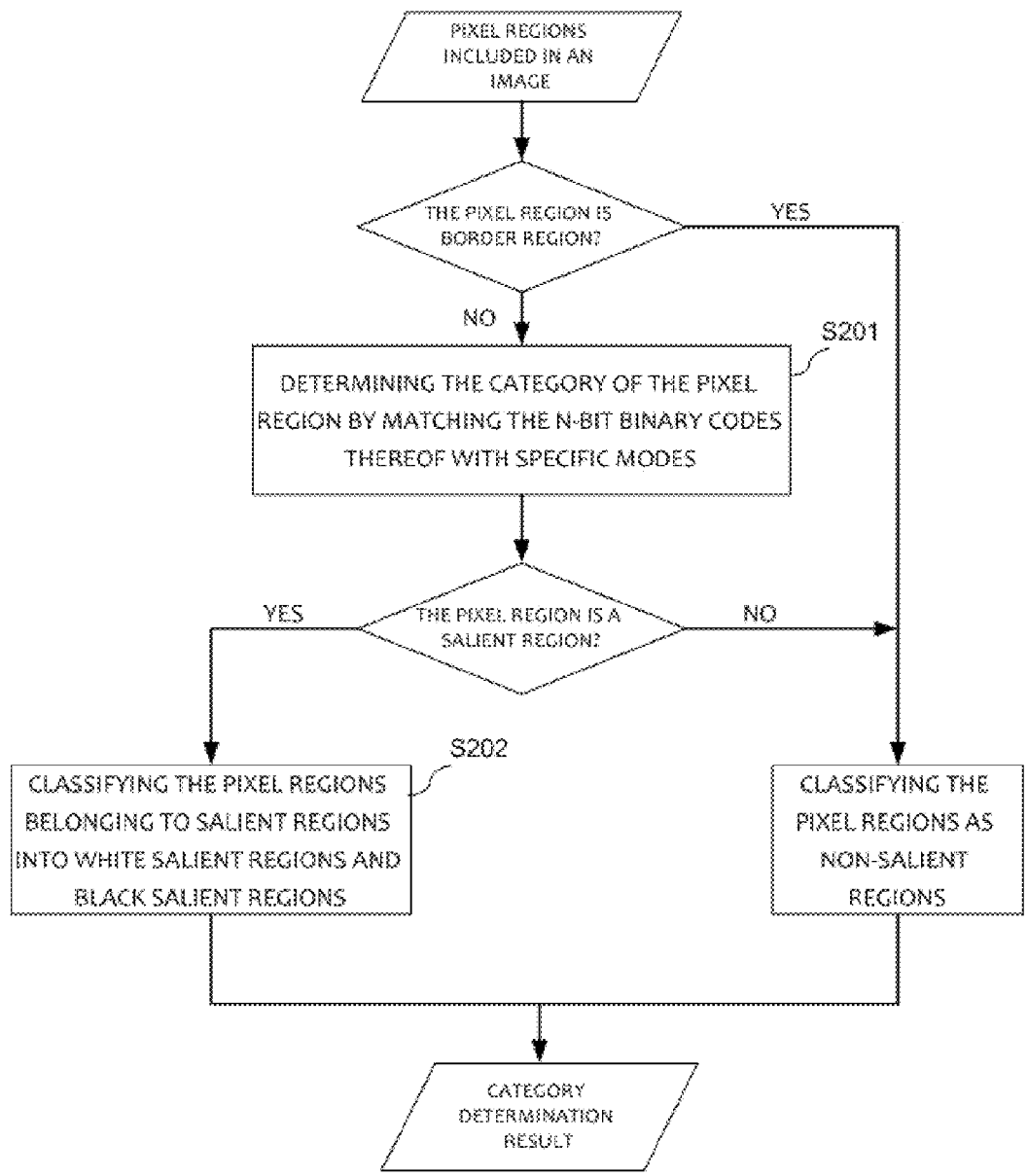
FIG. 27 is a flow chart illustrating the process of region category determining step in FIG. 24.

More specifically, in step S202 of FIG. 27, the pixel regions which belong to the first pixel region category can be classified into first sub-pixel region category and second sub-pixel region category. Wherein, with respect to each of the pixel regions which belong to the first pixel region category, when in the plurality of neighboring pixel regions of the pixel region, the number of the neighboring pixel regions whose pixel region values each is larger than the pixel region value of the pixel region is more than the number of the neighboring pixel regions whose pixel region values each is smaller than the pixel region value of the pixel region, the pixel region is classified into the first sub-pixel region category (black salient region), otherwise, the pixel region is classified into the second sub-pixel region category (white salient region).

The above further classification process will be described in detail with reference to FIG. 26. In the classification, the classification would be based on the comparison of the pixel region values of the center pixel region and its neighboring pixel regions. More specifically, with reference to FIG. 26, the pixel region value of the center pixel region is 54, the number of the neighboring pixel regions whose pixel region values are larger than the pixel region value of the center pixel region, that is, whose pixel region values are larger than 54, is 4, and the number of the neighboring pixel regions whose pixel region value are smaller than the pixel region value of the center pixel region, that is, whose pixel region values are smaller than 54, is 4. Since the former number is equal to the latter number, the center pixel region would be determined as white salient region.

With the above determination of pixel region category, a pixel region would be finally classified into a category included in three categories: white-salient region, black-salient region and non-salient region.

Figure 30:
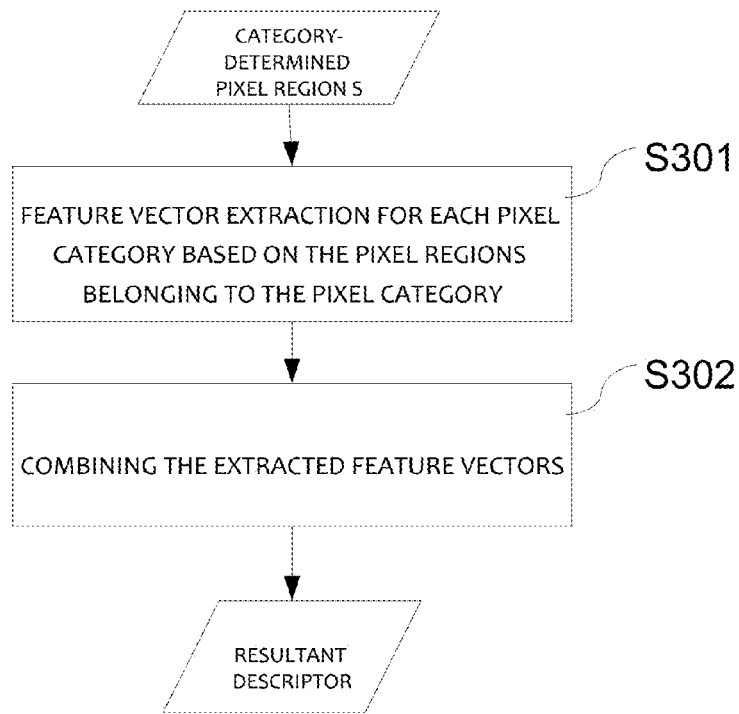
FIG. 30 is a flow chart illustrating the process of descriptor generating step in FIG. 24.

Hereinafter, the descriptor generating step will be described with reference to FIG. 30.

In step S301 (hereinafter to be referred to as feature vector extracting step), with respect to each of pixel region categories determined by the region category determining step, color features of all pixels in the all pixel regions belong to the pixel region category are extracted as the feature vector of the pixel region category.

In step S302 (hereinafter to be referred to as combining step), the extracted feature vector of each pixel region category are combined into a single vector to obtain the descriptor of the image.

Figure 29:
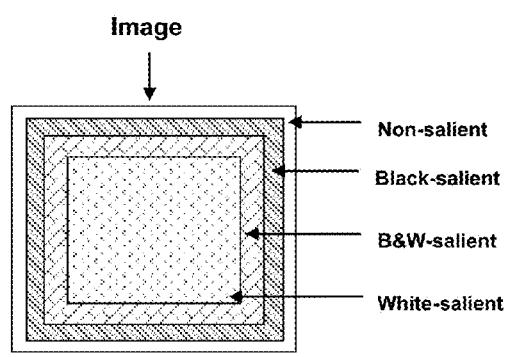
FIG. 29 schematically illustrates pixel classification of an image according to the determined pixel region categories.

Next, the process in step S301 will be described. In this process, all the pixels in the image would firstly be classified according to the determined pixel region categories. More specifically, as shown in FIG. 29, the pixel regions included in an image may include three categories, that is, white salient region, black salient region and non-salient region, thus all the pixels in the image may be classified into three categories corresponding to the determined three pixel region categories one by one. Wherein, all the pixels belonging to white salient region are classified as white-salient category, all the pixels belonging to black salient region are classified as black-salient category and all the other pixels are classified as non-salient category. However, a pixel may belong to both white-salient category and black-salient category. The reasons may are as follows.

In a common implementation, the descriptor generation method of the present invention may be applied to pixel regions included in an image beginning from any side of the image, such as, left side. In such a manner, the descriptor generation method may be applied to pixel regions sequentially, just like scanning of the pixel regions. More specifically, the encoding step and category determining step of the descriptor generation method may be applied to each pixel region sequentially, so as to determine the pixel category of pixels in each pixel region and finally determine the category of all pixels included in the image.

The scanning of the pixel region may be performed on a step-by-step basis, and the step corresponds to a distance which is expressed by pixel count and can be chosen by the operator according to the actual operational environment, performance requirement, etc. For example, the step may be equal to the length of one pixel region in the scanning direction, such as the above described scale S. Naturally, the step may be other value other than the length of one pixel region in the scanning direction, such as 1. In such a case, some pixel common to the preceding region and the current region may be determined as belonging to both white-salient category and black-salient category.

Please note that FIG. 29 is only a schematic diagram illustrating the principle of pixel classification, and the layout of the pixel categories are only illustrative and can vary with any global distribution of pixel region categories.

After all pixels in the image have been classified into a varieties of categories, feature, such as, color feature, for each category will be extracted. The feature extraction process of the present invention will be described with reference to FIGS. 13A and 13B. Note that other feature extraction processes as known in the art also can be used without departing from the spirit of the present invention and adversely influence the technical effect thereof.

Figures 31A, 31B:
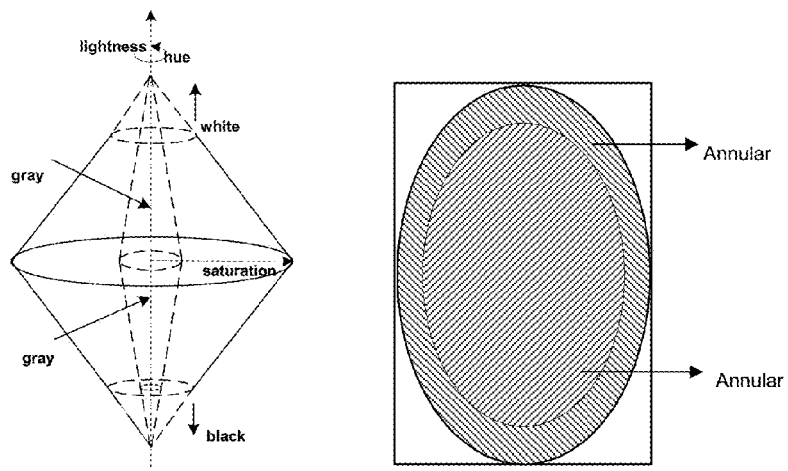
FIGS. 31A and 31B illustrate an example of feature vector extraction.

FIGS. 13A and 13B illustrate an example for feature vector extraction process in the present invention. First, image pixels in HLS color space are quantized. Wherein, the whole space is partitioned into gray and color sections, and then gray section is quantized into 6 color bins and color section is quantized into 6*3*6 color bins, as shown in FIG. 31A. Then, the whole image region is quantized into 2 annular regions, as shown in FIG. 31B. Finally, statistic of quantized color feature for each annular region are generated and combined as a vector to represent the category feature.

The combining step further may include weighted combining the extracted feature vector of each pixel category to obtain a single vector for the image. The combining step further may include assembling the extracted feature vector of each pixel category sequentially into a single vector for the image to obtain the descriptor thereof.

In an example, the combination of feature vectors can be performed by assigning weight factor for each category feature vector, and assembling all category feature vectors assigned with the corresponding weight factor into a single more discriminative feature descriptor to describe the source image.

Figure 32:
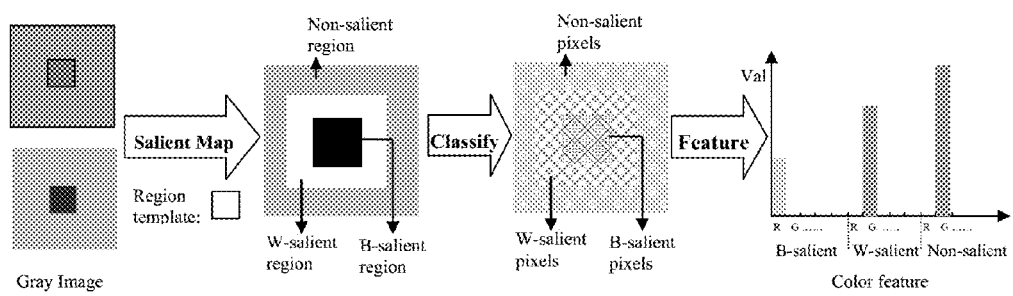
FIG. 32 illustrates a descriptor generation schematic result achieved by the method according to the second embodiment of the present invention.

Whereby, a descriptor of a regional image can be generated by utilizing the method according to the second embodiment of the present invention, as shown in FIG. 32.

Although the description has be made with reference to the accompanying drawings, the feature vector extraction and combination method is not limited to those methods described herein, and those skilled in the art can understand that other feature vector extraction and combination methods are also applicable to the present invention. In addition, notice that the thresholds illustrated in the embodiments are only examples, and they are not limited to those values.

Figure 33:
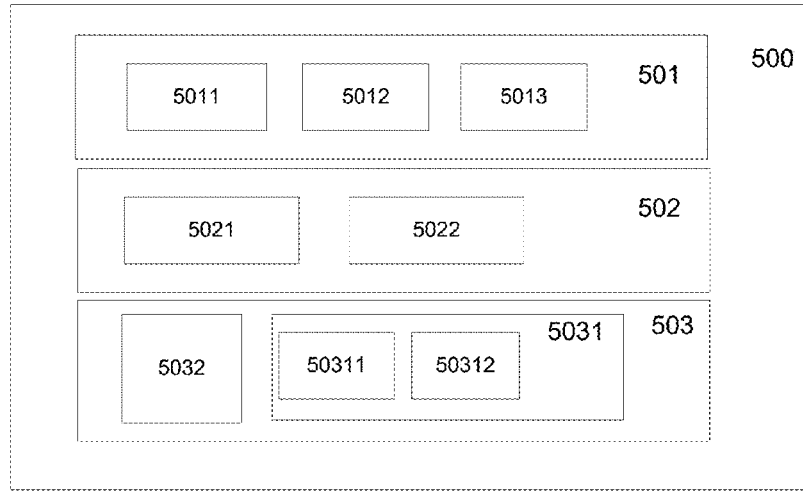
FIG. 33 is a block diagram illustrating a system for generating a descriptor of an image according to the second embodiment of the present invention.

FIG. 33 is a block diagram illustrating a system for generating a descriptor of an image according to the second embodiment of the present invention.

As shown in FIG. 33, the descriptor generating system 500 can include encoding unit 501 configured to, with respect to each pixel region of the plurality of pixel regions, encode the pixel region into M pieces of N-bit binary code, wherein each bit in a N-bit binary code corresponds to one of a plurality of neighboring pixel regions of the pixel region, region category determining unit 502 configured to, with respect to each pixel region whose category is to be determined of the plurality of pixel regions, match at least one of the M pieces of N-bit binary code of the pixel region whose category is to be determined with a corresponding specific mode of a plurality of specific modes, so as to determine the pixel region category of the pixel region, and descriptor generating unit 503 configured to generate the descriptor of the image based on the pixel region categories determined by the region category determining unit by utilizing feature vector extraction.

Preferably, the encoding unit 501 can include binary code encoding unit 5011 configured to directly obtain M pieces N-bit binary codes for a pixel region by, with respect to each of neighboring pixel regions of the pixel region, determining the N-bit binary code among the M pieces of N-bit binary codes to which the neighboring pixel region is related, and setting the value of the bit in the N-bit binary code corresponding to the neighboring pixel region as the specific binary level based on the determining result.

Preferably, the encoding unit 501 can include ternary code encoding unit 5012 configured to encoding the pixel region into one 8-bit ternary code, wherein each bit in the 8-bit ternary code corresponds to one neighboring pixel region among the eight neighboring pixel regions, and code transforming unit 5013 configured to transforming the one 8-bit ternary code into the 3 pieces of 8-bit binary code for the pixel region, wherein a bit whose value is m-th level in the 8-bit ternary code is reflect into the m-th 8-bit binary code.

Preferably, the region category determining unit 502 can include a unit 5021 configured to, with respect to each pixel region whose category is to be determined among the plurality of pixel regions, in a case in which all bits included in one of the first 8-bit binary code and third 8-bit binary code are not a specific level in binary notation and the other 8-bit binary code matches with the first specific mode, or in a case, other than the case, in which the second 8-bit binary code of the pixel region matches with the second specific mode, determine the pixel region as belonging to the first pixel region category. The unit 502 can determine the pixel region excluded from the above cases as belonging to the second pixel region category. The region category determining unit 502 further can include a unit 5022 configured to classify the pixel regions which belong to the first pixel region category into first sub-pixel region category and second sub-pixel region category.

Preferably, the descriptor generating unit 503 can include feature vector extracting unit 5031 configured to, with respect to each of pixel region categories determined by the region category determining unit, extract features of all pixels in the all pixel regions belong to the pixel region category as the feature vector of the pixel region category, and combining unit 5032 configured to combine step of combining the extracted feature vector of each pixel region category into a single vector to obtain the descriptor of the image.

The combining unit 5031 can further include a unit 50311 configured to weighted combine the extracted feature vector of each pixel region category to obtain the single vector. The combining unit 5031 can further include a unit 50312 configured to assemble the extracted feature vector of each pixel region category sequentially into the single vector to obtain the descriptor of the image.

[Advantageous Effect]

The descriptor generation method according to the second embodiment of the present invention enables the descriptor generated for an image to be more robust against large illumination variant, view-point change and non-rigid deformation, and retain more local structures of the image; meanwhile, it is feature independent and can combine with the image partition based method to get more discriminative. Furthermore, it is computational efficient and consequently can be used in object detection, recognition, tracking and retrieval for images and videos.

[Application Example]

Hereinafter, an example in which the descriptor generation method according to the second embodiment of the present invention is applied will be described with reference to FIGS. 34A to 34C. FIG. 34A illustrates the original image to be described. FIG. 34B illustrates the pixel classification result of the original image achieved by the present method, and FIG. 34C illustrates obtained color feature vector of the original image.

As shown in FIG. 34A, the original image may be a dog face. As shown in FIG. 34B, the black pixels (pixel 1) are non-salient category, the red (medium grey) pixels (pixel 2) are black-salient category, the blue (dark grey) pixels (pixel 3) are white-salient category and the magenta (light grey) pixels (pixel 4) are both-black and white-salient categories.

Please note that FIG. 34B is only a schematic diagram illustrating the pixel classification, and the shape of the pixel categories are only illustrative and can vary with any global distribution of pixel region categories. More specifically, although in FIG. 34B, each of the black pixels, the red-pixels and the blue pixels is in the shape of square, their shape can vary depending on the step in the scanning of the pixel region described as above.

The color feature vector as shown in FIG. 34C respectively corresponds to non-salient category, black salient category and white salient category from the left side, wherein a pixel which belongs to both black and white-salient categories would be counted in each of bins corresponding to the black-salient category and white-salient category respectively, and it is clear that the color feature vector is obtained by assembling the non-salient category, black salient category and white salient category sequentially.

Moreover, the image descriptor generating method and system according to the first and second embodiments of the present invention can be used in many applications which refer to image detecting, recognizing, distinguishing, etc. One example of application is automatic focus in camera to user-registered object. More specifically, with respect to an sample image registered by user, the image descriptor generating method and system can be used to generate the descriptor for the sample image, and then the image descriptor generating method and system can be used to generate descriptor for an image captured by the camera in real time, and then the two descriptors will be compared to detect an regional image which complies with the user-registered object, so that better images and videos can be obtained.

Now an image detection method using the image description vector according to the present invention will be described with reference to FIG. 35.

Figure 35:
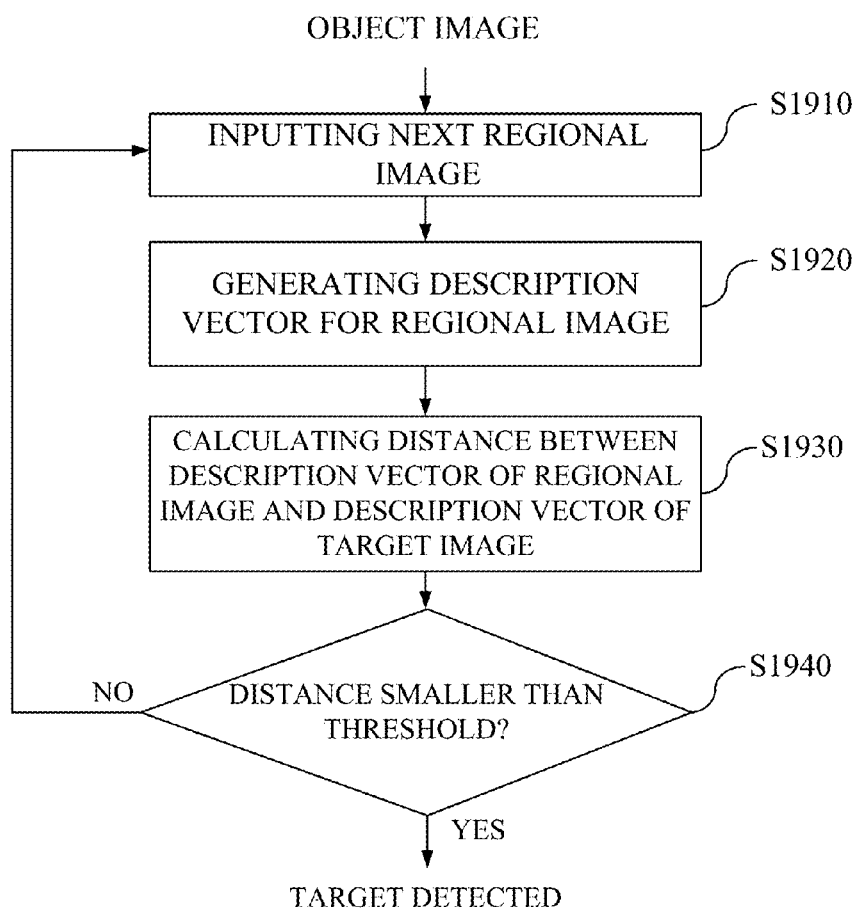
FIG. 35 is a schematic flowchart showing the process of the image detection method according to an embodiment of the present invention.

FIG. 35 is a schematic flowchart showing the process of the image detection method according to an embodiment of the present invention. As shown in FIG. 35, the image detection method comprises: an inputting step S1910 of inputting a regional image of an object image; an image description vector generating step S1920 of performing the method shown in FIG. 11, 14, 16 or 24 on the regional image to generate an image description vector as a regional image description vector; a calculating step S1930 of calculating a distance between the regional image description vector and a target image description vector registered in advance in a database, the target image description vector being formed in advance by performing the method shown in FIGS. 11, 14, 16 or 24 on a target image; and a determining step S1940 of determining, if the distance is smaller than a particular threshold ("YES" in step S1940 in FIG. 35), that a regional image corresponding to the target image is detected; or adjusting, if the distance is not smaller than the particular threshold ("NO" in step S1940 FIG. 35), the location and/or size of the regional image to obtain a regional image to be processed subsequently.

The process shown in FIG. 35 can be used to search a target image (for example, a face) in an input image. The steps S1910-S1940 can be repeated for all the regional images in the input image.

Figure 36:
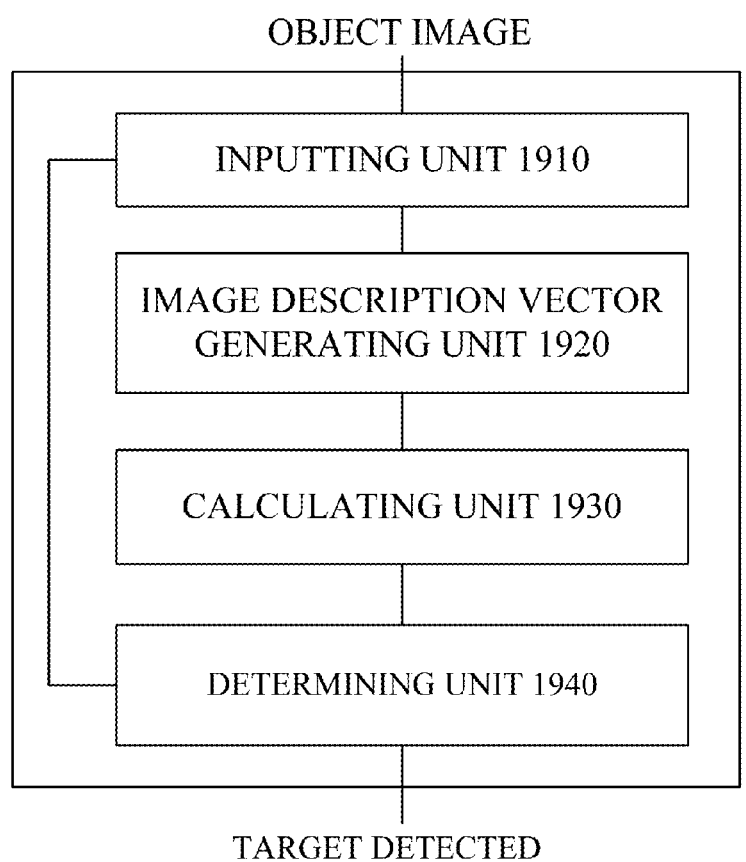
FIG. 36 is a block diagram schematically showing an image detection apparatus according to an embodiment of the present invention.

FIG. 36 is a block diagram schematically showing an image detection apparatus according to an embodiment of the present invention. The image detection apparatus comprises: an inputting unit 1910 configured for inputting a regional image of an object image; an image description vector generating unit 1920 configured for performing the method shown in FIG. 11, 14, 16 or 24 on the regional image to generate an image description vector as a regional image description vector; a calculating unit 1930 configured for calculating a distance between the regional image description vector and a target image description vector registered in advance in a database, the target image description vector being formed in advance by performing the method shown in FIG. 11, 14, 16 or 24 on a target image; and a determining unit 1940 configured for determining, if the distance is smaller than a particular threshold, that a regional image corresponding to the target image is detected; or adjusting, if the distance is not smaller than the particular threshold, the location and/or size of the regional image to obtain a regional image to be processed next.

The distance as mentioned above can be a histogram intersection distance or a chi-square distance. However, any other methods of calculating a distance (or proximity or similarity) between two histograms or between two vectors can be used here.

In order to evaluate the method and apparatus according to the present invention, the method for generating image description vectors were applied in a User Registered Object Detection (UROD) system. A single sample of an image of a target object (a target image) was registered by the user and an image detection apparatus was created to detect the target object adaptively. The target image would be located from the input video frames using said image detection apparatus. Three image description methods, that is, the LBP method, the LTP method and the method according to the present invention, were used separately in the UROD system to create a detector respectively.

PASCAL evaluation criterion was adopted as the evaluation criterion here. Regions in the frames considered as the regions including the target image were labelled correctly manually. When (area of labelled region∩area of detected region)/(area of labelled region∪area of detected region)> $T_{detection}$, the detected region was regarded as a correct detected region. The symbol "∩" means an intersection operation and the symbol "∪" indicates a union operation. The $T_{detection}$ was set as 50% in this evaluation. This is to make a balance between detecting regions truly containing the target as much as possible and keeping falsely detected regions not containing the target as few as possible.

A recall rate and a reject rate for the evaluation were defined as follows.

In a case where the registered target objects occur $N_{occurrence}$ times and $N_{detection}$ of these registered target objects are correctly detected, then $N_{detection}/N_{occurrence}$ is defined as the recall rate. That is to say, the recall rate indicates how many true target objects can be correctly detected in a case where true target objects occur 100 times.

In a case where the registered target objects occurred $N_{occurrence}$ times and $N_{false}$ image regions are wrongly detected as the registered target objects, then $N_{false}/N_{occurrence}$ is defined as the reject rate. That is to say, the reject rate indicates how many false image regions are detected per 100 occurrences of the true target objects.

Software and hardware configurations for the evaluation are shown in the following Table 1.

TABLE 1

| Software | Operating System | Win-XP professional, 2002 Version, service pack 2 |
|---|---|---|
| | Application | N/A |
| | Compiler Vision | VC++ 2005 |
| Hardware | CPU | Intel Core (TM)2 Quad CPU, 2.40 GHz |
| | Memory | 2.00 GB |
| | Hard Disk | 300 GB |

Evaluation results for the three methods are shown in the following Table 2.

TABLE 2

| | Target in frames | Recall rate (detection) | Total frames | Reject rate (false alarm) |
|---|---|---|---|---|
| LBP | 23620 | 93.21% | 88566 | 97.56% |
| LTP | 23620 | 87.67% | 88566 | 48.49% |
| First embodiment of the present invention | 23620 | 93.68% | 88566 | 32.56% |

It can be seen from the evaluation results shown in Table 2, in addition to the higher efficiency as described above due to the reduction of code patterns to be stored and used, the method for generating the image description vector according to the first embodiment can also reduce the reject rate (false alarm) and at the same time improve the recall rate (detection) in comparison with the LBP and LTP methods.

Furthermore, the comparison between the descriptor generation method of the second embodiment according to the present invention and BIC method are also performed in such UROD system and such software and hardware configuration as shown in Table 1.

The evaluation results of the second embodiment of the present invention are as shown in Table 3.

TABLE 3

| UROD system | Target in frames | Recall rate (detection) | Total frames | Reject rate (false alarm) |
|---|---|---|---|---|
| BIC | 123130 | 78.68% | 1660915 | 39.00% |
| Second embodiment of the present invention | 123130 | 85.62% | 1660915 | 22.81% |

It is clear from Table 3 that the descriptor generation method according to the second embodiment of the present invention can reduces the reject rate (false alarm), wherein reject rate in the present invention is about one-half of BIC method, and improve the Recall rate (detection), wherein the performance of the present invention is improve with about 7 percentage points.

Therefore, the descriptor generation method of the present invention can correctly and effectively generate the descriptor, and its effectiveness is improved with respect to BIC method.

Hereinafter, a comparison example between the method according to the second embodiment of the present invention and the circular based image partition method will be described with reference to FIGS. 37A to 37B, so as to verify the effectiveness of our descriptor generation method.

FIG. 37A illustrates that an image resulting from an original image, for example, a dog face as shown in FIG. 34A, which has been subjected to in-plane rotation 90°, and FIG. 37B illustrates that an image resulting from the original image which has been subjected to out-plane rotation (15°, 15°, 0°).

With respect to the rotated images shown in FIGS. 37A and 37B, the descriptor generation method of the second embodiment of the present invention and the circular based partition method are applied respectively to obtain the corresponding color feature vector based on the same color quantization method. To more clearly understand performance difference between respective methods, we use the similarity with the original image to represent the robustness against in-plane and out-plane rotations of respective methods. Two histogram distance metrics are introduced: histogram intersection as in the following formula (1) and chi-square as in the following formula (2):

$$H_{HI}(x, x') = \sum_{i<=d} \min(x_i, x'_i) \quad (1)$$

$$D_{Chi}(x, x') = \sum_{i<=d} \frac{(x_i - x'_i)^2}{(x_i + x'_i)} \quad (2)$$

wherein n is the number of bins included in the histogram, Xi, Xi' represent values of the i-th bin in the two histograms, respectively, and i represents the i-th bin in the histogram.

Herein, The larger the value of the histogram intersection is, the more similar the two histograms are. On the contrary, the smaller the chi-square value is, the more similar the two histograms are.

The similarity with the original image is measured with the following formula:

$$S(x, x') = \frac{D(x, x')}{|x|}, \text{ where } |x| = \sum_{i<=d} x_i \quad (3)$$

The similarity between rotated images and original image is shown in Table 4.

TABLE 4

|  | Histogram intersection | | Chi-square | |
| --- | --- | --- | --- | --- |
|  | In-plane | Out-plane | In-plane | Out-plane |
| Second embodiment of the present invention | 0.963 | 0.815 | 0.009 | 0.146 |
| Circular based method | 0.951 | 0.784 | 0.011 | 0.189 |

It can be seen from Table 4 that the histogram intersection value and Chi-square value corresponding to the second embodiment of the present invention both are superior to that of the circular-based partition method. Therefore, the robustness against rotation of the descriptor achieved by the present invention is superior to that of the circular-based partition method.

Moreover, the image detecting method and system according to the present invention can be used in many applications. One example of application is automatic focus in camera to user-registered object. More specifically, with respect to the whole image acquired by the camera in real time, the image detecting method and system of the present invention can be used to detect a regional image which complies with the user-registered object, and then the camera can focus automatically based on the detection result, so that better images and videos can be obtained. Naturally, the image detecting method and system can be applied to any other application which refer to image detecting, recognizing, distinguishing, etc.

It is possible to carry out the method and apparatus of the present invention in many ways. For example, it is possible to carry out the method and apparatus of the present invention through software, hardware, firmware or any combination thereof. The above described order of the steps for the method is only intended to be illustrative, and the steps of the method of the present invention are not limited to the above specifically described order unless otherwise specifically stated. Besides, in some embodiments, the present invention may also be embodied as programs recorded in recording medium, including machine-readable instructions for implementing the method according to the present invention. Thus, the present invention also covers the recording medium which stores the program for implementing the method according to the present invention.

Although some specific embodiments of the present invention have been demonstrated in detail with examples, it should be understood by a person skilled in the art that the above examples are only intended to be illustrative but not to limit the scope of the present invention. It should be understood by a person skilled in the art that the above embodiments can be modified without departing from the scope and spirit of the present invention. The scope of the present invention is defined by the attached claims.

This application claims the benefit of Chinese Patent Application No. 201210045691.8 filed on Feb. 24, 2012, and Chinese Patent Application No. 201210044156.0 filed on Feb. 24, 2012, which are hereby incorporated by reference herein in their entirety.

What is claimed is:

1. An apparatus for generating an image description vector comprising:
at least one processor and at least one memory which are coupled to each other and cooperating to act as:
an encoding unit configured for encoding each of a plurality of pixel regions of an image into M pieces of N-bit binary codes, wherein each bit of an N-bit binary code represents a neighbouring pixel region which is in a neighbourhood of a corresponding pixel region; and
a generating unit configured for generating an image description vector of the image based on matching each of the M pieces of N-bit binary code of each pixel region of the plurality of pixel regions with a particular code pattern,
wherein M is an integer of 3 or larger, and N is an integer of 3 or larger,
wherein the generating unit comprises:
a feature extracting unit configured for, for an m-th N-bit binary code in each M pieces of N-bit binary codes corresponding to each pixel region of the plurality of pixel regions, if the m-th N-bit binary code matches a particular code pattern of an m-th category of M categories, extracting the m-th N-bit binary code as a salient N-bit binary code of that m-th category; and
an image description vector generating unit configured for counting the number of salient N-bit binary codes for each category of the M categories, to form an image description vector,
wherein, $1 \leq m \leq M$.

2. The apparatus according to claim 1, wherein N is 8, M is 3, and the M pieces of N-bit binary codes are three 8-bit-binary codes.

3. The apparatus according to claim 2, wherein the encoding unit comprises:
a ternary encoding sub-unit configured for encoding each of the plurality of pixel regions into a 8-bit ternary code;
a code transforming unit configured for transforming each 8-bit ternary code into the three 8-bit binary codes, wherein each 8-bit binary code of the three 8-bit binary codes corresponds to one level of the ternary levels.

4. The apparatus according to claim 1, wherein m-th N-bit binary code of the M pieces of N-bit binary codes represents the neighbouring pixel regions which are in the neighbourhood of the corresponding pixel region and have pixel region values within an m-th pixel region value range among M pixel region value ranges.

5. The apparatus according to claim 4, wherein a three pixel region value ranges includes a first pixel region value range, a second pixel region value range, and a third pixel region value range, and
for a given pixel region, the first pixel region value range is a pixel region value range for which a difference between a pixel region value therein and a pixel region value of the given pixel region is larger than a first threshold, the second pixel region value range is a pixel region value range for which the difference between the pixel region value therein and the pixel region value of the given pixel region is not larger than the first threshold and not smaller than a second threshold, and the third pixel region value range is a pixel region value range for which the difference between the pixel region value therein and the pixel region value of the given pixel region is smaller than the second threshold.

6. The apparatus according to claim 1, wherein each of the plurality of pixel regions is constituted of one pixel, and a pixel region value is a pixel value.

7. The apparatus according to claim 1, wherein each of the plurality of pixel regions is constituted of a plurality of pixels, and a pixel region value is a combined value of pixel values of said plurality of pixels in that pixel region.

8. The apparatus according to claim 7, wherein the combined value is one selected from a group consisting of an arithmetical average value, a geometric average value, a weighted average value, and a median value.

9. The apparatus according to claim 1, wherein the plurality of pixel regions of the image do not include pixel regions located at a border of the image.

10. The apparatus according to claim 1, wherein the pixel regions in the image are arranged in a matrix, neighbouring pixel regions of a pixel region include eight pixel regions which have that pixel region as a centre and form, together with that pixel region, a 3×3 matrix of pixel regions.

11. The apparatus according to claim 1, wherein N is 8, M is 3, the M pieces of N-bit binary codes are three 8-bit-binary codes, and the M categories are three categories, and
the three categories include a high pixel region value category, an intermediate pixel region value category and a low pixel region value category, pixel region values corresponding to 8-bit binary codes of the high pixel region value category are within a first pixel region value range, pixel region values corresponding to 8-bit binary codes of the intermediate pixel region value category are within a second pixel region value range, and pixel region values corresponding to 8-bit binary codes of the low pixel region value category are within a third pixel region value range.

12. The apparatus according to claim 1, wherein N is 8, M is 3, the M pieces of N-bit binary codes are three 8-bit-binary codes, and the M categories are three categories, and
the three categories include a high pixel region value category, an intermediate pixel region value category and a low pixel region value category, 8-bit binary codes of the high pixel region value category correspond to a first level of ternary levels, 8-bit binary codes of the intermediate pixel region value category correspond to a second level of the ternary levels, and 8-bit binary codes of the low pixel region value category correspond to a third level of the ternary level.

13. The apparatus according to claim 1, wherein the image description vector generating unit comprises:
a first sub-unit configured for, respectively for each category of the M category, counting the number of salient N-bit binary codes which match respective code patterns of the plurality of particular code patterns, to form image description vector parts for respective categories; and
a second sub-unit configured for cascading the image description vector parts of the M categories to form an image description vector.

14. The apparatus according to claim 13, further comprising:
a normalization unit configured for dividing the image description vector by the pixel region number of the plurality of pixel regions, to form a normalized image description vector.

15. The apparatus according to claim 1, wherein N is 8, M is 3, the M pieces of N-bit binary codes are three 8-bit-binary codes, and the M categories are three categories, and
the plurality of particular code patterns include a first set of particular code patterns and a second set of particular code patterns, the first set of particular code patterns being constituted of a first subset of patterns and a second subset of patterns, and the second set of particular code patterns being constituted of a third subset of patterns,
wherein in each 8-bit binary code of the first subset of patterns, changeover of a high level to a low level occurs at most once, and the changeover of a low level to a high level occurs at most once,
each 8-bit binary code of the second subset of patterns is a double-symmetric 8-bit binary code, wherein a pattern produced by arranging the double-symmetric 8-bit binary code at 8 positions that equally divide a circle is axial symmetric with respect to both axes of two mutually perpendicular directions,
each 8-bit binary code of the third subset of patterns is a symmetric 8-bit binary code, wherein a pattern produced by arranging the symmetric 8-bit binary code at 8 positions that equally divide a circle is axial symmetric with respect to an axis of at least one direction, and
in the three categories, the first category and the third category both correspond to the first set of particular code patterns, and the second category corresponds to the second set of particular code patterns.

16. The apparatus according to claim 1, wherein the generating unit comprises:
a region category determining unit configured for, with respect to each pixel region whose category is to be determined of the plurality of pixel regions, matching at least one of the M pieces of N-bit binary codes of the pixel region whose category is to be determined with a corresponding particular code pattern, to determine the pixel region category of the pixel region, and
a description vector generating unit configured for generating the description vector of the image based on pixel region categories determined by the region category determining unit by utilizing feature vector extraction for the pixels included in the image.

17. The apparatus according to claim 16, wherein, border pixel regions belong to a second pixel region category.

18. The apparatus according to claim 16, wherein, the description vector generating unit further includes:
feature vector extracting unit configured for, with respect to each of pixel region categories determined by the region category determining unit, extracting features of all pixels in all the pixel regions belonging to the pixel region category as the feature vector of the pixel region category; and
combining unit configured for combining the extracted feature vector of each pixel region category into a single vector to obtain the descriptor of the image.

19. The apparatus according to claim 18, wherein, the combining unit further includes a unit configured for weighted combining the extracted feature vector of each pixel region category to obtain the single vector.

20. The apparatus according to claim 18, wherein, the combining unit further includes a unit configured for assembling the extracted feature vector of each pixel region category sequentially into the single vector to obtain the image description vector of the image.

21. The apparatus according to claim 16, wherein,
N is 8, M is 3, and the M pieces of N-bit binary codes are three 8-bit-binary codes, and
the corresponding particular code pattern is included in a plurality of particular code patterns, the plurality of particular code patterns including first particular code pattern and second particular code pattern, the first particular code pattern corresponding to the first and third 8-bit binary codes and the second particular code pattern corresponding to the second 8-bit binary code,
wherein, the first particular code pattern is a mode in which a pattern formed by respective specific-level bits included in a 8-bit binary code when being positioned in corresponding circular 8-equidistant positions is one point or one continuous line, and
the second particular code pattern is a mode in which a pattern formed by respective specific-level bits included in a 8-bit binary code when being positioned in corresponding circular 8-equidistant positions is symmetric with respect to the center of the circle or at least one axis, any of the at least one axis passes through the center of the circle.

22. The apparatus according to claim 21, wherein, the region category determining unit is further configured for:
with respect to each pixel region whose category is to be determined among the plurality of pixel regions, in a case in which none of bits included in one of the first 8-bit binary code and third 8-bit binary code of the pixel region is a specific level in binary notation and the other 8-bit binary code matches with the first particular code pattern, or in cases other than the above case, in which the second 8-bit binary code of the pixel region matches with the second particular code pattern, determining the pixel region as belonging to the first pixel region category,
otherwise, determining the pixel region as belonging to the second pixel region category.

23. The apparatus according to claim 22, wherein, the region category determining unit further includes:
a unit configured for classifying the pixel regions which belong to the first pixel region category into first sub-pixel region category and second sub-pixel region category;
wherein, with respect to each of the pixel regions which belong to the first pixel region category, when in the plurality of neighboring pixel regions of the pixel region, the number of the neighboring pixel regions each of which pixel region value is larger than the pixel region value of the pixel region is more than the number of the neighboring pixel regions each of which pixel region value is smaller than the pixel region value of the pixel region, the pixel region is classified into the first sub-pixel region category,
otherwise, the pixel region is classified into the second sub-pixel region category.

24. An apparatus for generating an image description vector of multi-resolution, comprising:
a first image description vector generating unit configured for generating a first image description vector by means of the apparatus according to claim 1 for an input image;
a resizing unit configured for resizing the input image to generate a resized image;
a second image description vector generating unit configured for generating a second image description vector by means of the apparatus according to claim 1 for the resized image; and
a cascading unit configured for cascading the first image description vector and the second image description vector to generate an image description vector of multi-resolution.

25. A method for generating an image description vector comprising:
an encoding step of encoding each of a plurality of pixel regions of an image into M pieces of N-bit binary codes, wherein each bit of an N-bit binary code represents a neighbouring pixel region which is in neighbourhood of a corresponding pixel region; and
a generating step of generating an image description vector of the image based on matching each of the M pieces of N-bit binary code of each pixel region of the plurality of pixel regions with a particular code pattern,
wherein M is an integer of 3 or larger, and N is an integer of 3 or larger,
wherein the generating step comprises:
a feature extracting step of, for an m-th N-bit binary code in each M pieces of N-bit binary codes corresponding to each pixel region of the plurality of pixel regions, if the m-th N-bit binary code matches a particular code pattern of an m-th category of M categories, extracting the m-th N-bit binary code as a salient N-bit binary code of that m-th category; and
an image description vector generating step of counting the number of salient N-bit binary codes for each category of the M categories, to form an image description vector, wherein $1 \leq m \leq M$.

26. A method for generating an image description vector of multi-resolution, comprising:
a first image description vector generating step of generating a first image description vector by performing the method according to claim 25 on an input image;
a resizing step of resizing the input image to generate a resized image;
a second image description vector generating step of generating a second image description vector by performing the method according to claim 25 on the resized image; and
a cascading step of cascading the first image description vector and the second image description vector to generate an image description vector of multi-resolution.

* * * * *